United States Patent
Sharma

(10) Patent No.: US 12,250,431 B2
(45) Date of Patent: *Mar. 11, 2025

(54) CONTENT RECEIVER CONTROL BASED ON INTRA-CONTENT METRICS AND VIEWING PATTERN DETECTION

(71) Applicant: DISH Network L.L.C., Englewood, CO (US)

(72) Inventor: Abhijit Sharma, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,539

(22) Filed: Jan. 13, 2023

(65) Prior Publication Data

US 2023/0156285 A1     May 18, 2023

Related U.S. Application Data

(63) Continuation of application No. 17/391,393, filed on Aug. 2, 2021, now Pat. No. 11,558,671, which is a continuation of application No. 15/783,951, filed on Oct. 13, 2017, now Pat. No. 11,115,717.

(51) Int. Cl.
*H04N 21/466*     (2011.01)
*G06N 5/025*     (2023.01)
*H04N 21/442*     (2011.01)
*H04N 21/835*     (2011.01)

(52) U.S. Cl.
CPC ......... *H04N 21/4668* (2013.01); *G06N 5/025* (2013.01); *H04N 21/44204* (2013.01); *H04N 21/4661* (2013.01); *H04N 21/4665* (2013.01); *H04N 21/835* (2013.01)

(58) Field of Classification Search
None
See application file for complete search history.

(56) References Cited

U.S. PATENT DOCUMENTS

| | | | |
|---|---|---|---|
| 9,549,226 | B2 | 1/2017 | Quan et al. |
| 10,123,058 | B1 | 11/2018 | Sharma |
| 10,580,043 | B2 | 3/2020 | Publicover et al. |
| 10,820,019 | B2 | 10/2020 | Sharma |
| 11,115,717 | B2 | 9/2021 | Sharma |
| 2002/0083473 | A1 | 6/2002 | Agnihotri et al. |

(Continued)

*Primary Examiner* — Omar S Parra
(74) *Attorney, Agent, or Firm* — Kilpatrick Townsend & Stockton LLP

(57) ABSTRACT

Methods, systems, and machine-readable media are provided to facilitate content receiver control for particularized output of content items based on intra-content metrics. Observation data, corresponding to indications of detected content receiver operations associated with a content receiver and mapped to a first set of content items, may be processed. A first set of intra-content metrics may be detected. An audiovisual pattern of intra-content metrics may be mapped based on correlating the set of observation data with the first set of intra-content metrics. A second set of content items may be processed to detect a second set of intra-content metrics. A subset of the second set of content items may be selected based on a visual category and/or an audio category of the audiovisual pattern of intra-content metrics. The subset may be specified to cause a content receiver to modify operations to record and/or output content corresponding to the subset.

20 Claims, 7 Drawing Sheets

(56) References Cited

U.S. PATENT DOCUMENTS

| | | |
|---|---|---|
| 2003/0174837 A1 | 9/2003 | Candelore et al. |
| 2004/0143661 A1 | 7/2004 | Higashi et al. |
| 2004/0210928 A1 | 10/2004 | Hamzy et al. |
| 2004/0255150 A1 | 12/2004 | Sezan et al. |
| 2005/0137958 A1 | 6/2005 | Huber et al. |
| 2005/0149968 A1 | 7/2005 | Konig et al. |
| 2006/0195866 A1 | 8/2006 | Thukral |
| 2006/0212897 A1 | 9/2006 | Li et al. |
| 2007/0101360 A1 | 5/2007 | Gutta et al. |
| 2008/0235226 A1 | 9/2008 | Friedman |
| 2008/0276266 A1 | 11/2008 | Huchital et al. |
| 2008/0301737 A1 | 12/2008 | Hjelmeland Almas et al. |
| 2009/0055557 A1 | 2/2009 | Namai et al. |
| 2009/0089164 A1 | 4/2009 | Hengel et al. |
| 2009/0172030 A1 | 7/2009 | Schiff et al. |
| 2009/0234649 A1 | 9/2009 | Goodhew |
| 2009/0328125 A1 | 12/2009 | Gits et al. |
| 2010/0153993 A1 | 6/2010 | Konig et al. |
| 2011/0029540 A1 | 2/2011 | Ptucha et al. |
| 2011/0179445 A1 | 7/2011 | Brown et al. |
| 2011/0211812 A1 | 9/2011 | Tzoukermann et al. |
| 2012/0117583 A1 | 5/2012 | Gunatilake |
| 2013/0133003 A1 | 5/2013 | Goldschmidt Iki et al. |
| 2013/0148884 A1 | 6/2013 | Lee |
| 2013/0247083 A1 | 9/2013 | Impollonia et al. |
| 2014/0089958 A1 | 3/2014 | Nichols et al. |
| 2014/0133695 A1 | 5/2014 | Lienhart et al. |
| 2014/0153753 A1 | 6/2014 | Crockett |
| 2014/0161423 A1 | 6/2014 | Tesch et al. |
| 2014/0164507 A1 | 6/2014 | Tesch et al. |
| 2015/0082331 A1 | 3/2015 | Neumeier et al. |
| 2015/0375117 A1 | 12/2015 | Thompson et al. |
| 2016/0140224 A1 | 5/2016 | Jin et al. |
| 2016/0196270 A1 | 7/2016 | Dimaria et al. |
| 2016/0379274 A1 | 12/2016 | Irwin et al. |
| 2017/0115954 A1 | 4/2017 | Innes et al. |
| 2017/0201779 A1 | 7/2017 | Publicover et al. |
| 2017/0264934 A1 | 9/2017 | Guo et al. |
| 2017/0270562 A1 | 9/2017 | Ben-rubi et al. |
| 2018/0014053 A1 | 1/2018 | Venkatraman et al. |
| 2018/0082127 A1 | 3/2018 | Carlson et al. |
| 2018/0324473 A1 | 11/2018 | Sharma |
| 2019/0116398 A1 | 4/2019 | Sharma |
| 2019/0166403 A1 | 5/2019 | Yelton et al. |

CONTENT RECEIVER CONTROL BASED ON INTRA-CONTENT METRICS AND VIEWING PATTERN DETECTION

CROSS-REFERENCES TO RELATED APPLICATIONS

This application is a continuation of U.S. patent application Ser. No. 17/391,393, filed on Aug. 2, 2021, which is a continuation of U.S. patent application Ser. No. 15/783,951, filed on Oct. 13, 2017, now issued as U.S. Pat. No. 11,115,717. The entire disclosures of all of the aforementioned U.S. Patent Applications are hereby incorporated by reference, for all purposes, as if fully set forth herein.

BACKGROUND

This disclosure generally relates to content discovery and distribution, and more particularly to systems and methods for facilitating content receiver control based on intra-content metrics and viewing pattern detection.

Users of televisions and other video distribution platforms are now exposed to more varying types of content than ever before. In addition to live broadcasts of content and local recordings of content (e.g., using a digital video recorder), content may be accessible from various sources via a network (e.g., the Internet). However, with the proliferation of different content, a viewer can encounter a number of difficulties. Chief among the difficulties is the amount of time and effort necessary to search for particular programs of interest. The options can be overwhelming to many users and can make process of locating content difficult and inefficient.

Thus, there is a need for systems and methods that address the foregoing problems in order to provide viewers with better, more tailored viewer experiences. This and other needs are addressed by the present disclosure.

BRIEF SUMMARY

Various embodiments of the present disclosure relate generally to content discovery and distribution, and more particularly to systems and methods for facilitating content receiver control based on intra-content metrics and viewing pattern detection.

In one aspect, a method of content receiver control for particularized output of content items based at least in part on intra-content metrics is disclosed. The method may include performing one or a combination of the following, which may be performed by a content processing system. A set of observation data, corresponding to indications of detected content receiver operations associated with a content receiver and mapped to a first set of content items, may be processed. A first set of intra-content metrics of the first set of content items may be detected. The first set of intra-content metrics may include at least one visual characteristic and at least one audio characteristic for the first set of content items. The at least one visual characteristic may include at least one color characteristic of video content of the first set of content items. An audiovisual pattern, of intra-content metrics mapped to the content receiver based at least in part on correlating the set of observation data with the first set of intra-content metrics, may be specified. The audiovisual pattern of intra-content metrics may include: i) at least one visual category that includes the at least one visual characteristic, and ii) at least one audio category that includes the at least one audio characteristic. A second set of content items may be processed to detect a second set of intra-content metrics of the second set of content items. The second set of content items may be specified to be available at one or more future times. A subset of the second set of content items may be selected based at least in part on matching the second set of intra-content metrics to the at least one visual category and/or the at least one audio category of the audiovisual pattern of intra-content metrics. The subset of the second set of content items may be specified to cause a content receiver to modify operations to record and/or output content corresponding to the subset of the second set of content items.

In another aspect, a content processing system to facilitate content receiver control for particularized output of content items based at least in part on intra-content metrics is disclosed. The content processing system may include one or more processors. The content processing system may include a memory communicatively coupled with and readable by the one or more processors and having stored therein processor-readable instructions which, when executed by the one or more processors, cause the one or more processors to perform one or a combination of the following. A set of observation data, corresponding to indications of detected content receiver operations associated with a content receiver and mapped to a first set of content items, may be processed. A first set of intra-content metrics of the first set of content items may be detected. The first set of intra-content metrics may include at least one visual characteristic and at least one audio characteristic for the first set of content items. The at least one visual characteristic may include at least one color characteristic of video content of the first set of content items. An audiovisual pattern, of intra-content metrics mapped to the content receiver based at least in part on correlating the set of observation data with the first set of intra-content metrics, may be specified. The audiovisual pattern of intra-content metrics may include: i) at least one visual category that includes the at least one visual characteristic, and ii) at least one audio category that includes the at least one audio characteristic. A second set of content items may be processed to detect a second set of intra-content metrics of the second set of content items. The second set of content items may be specified to be available at one or more future times. A subset of the second set of content items may be selected based at least in part on matching the second set of intra-content metrics to the at least one visual category and/or the at least one audio category of the audiovisual pattern of intra-content metrics. The subset of the second set of content items may be specified to cause a content receiver to modify operations to record and/or output content corresponding to the subset of the second set of content items.

In yet another aspect, one or more non-transitory, machine-readable media are disclosed. The one or more non-transitory, machine-readable media may have instructions thereon which, when executed by one or more processing devices, cause the one or more processing devices to perform one or a combination of the following. A set of observation data, corresponding to indications of detected content receiver operations associated with a content receiver and mapped to a first set of content items, may be processed. A first set of intra-content metrics of the first set of content items may be detected. The first set of intra-content metrics may include at least one visual characteristic and at least one audio characteristic for the first set of content items. The at least one visual characteristic may include at least one color characteristic of video content of the first set of content items. An audiovisual pattern, of intra-content metrics mapped to the content receiver based at least in part on correlating the set of observation data with the first set of intra-content metrics, may be specified. The audiovisual pattern of intra-content metrics may include: i) at least one visual category that includes the at least one visual characteristic, and ii) at least one audio category that includes the at least one audio characteristic. A second set of content items may be processed to detect a second set of intra-content metrics of the second set of content items. The second set of content items may be specified to be available at one or more future times. A subset of the second set of content items may be selected based at least in part on matching the second set of intra-content metrics to the at least one visual category and/or the at least one audio category of the audiovisual pattern of intra-content metrics. The subset of the second set of content items may be specified to cause a content receiver to modify operations to record and/or output content corresponding to the subset of the second set of content items.

In various embodiments, the content receiver may include the content processing system. In various embodiments, information enabling identification of a first user of a plurality of users having profiles associated with the content receiver may be processed. The audiovisual pattern of intra-content metrics may be mapped to a first profile associated with the first user. Information enabling identification of a second user of the plurality of users having profiles associated with the content receiver may be processed. A second audiovisual pattern of intra-content metrics mapped to the content receiver based at least in part on correlating a second set of observation data with the first set of intra-content metrics may be specified. A second subset of the second set of content items may be selected based at least in part on matching the second set of intra-content metrics to at least one different visual category and/or at least one different audio category of the second audiovisual pattern of intra-content metrics. The second subset of the second set of content items may be specified to cause the content receiver to modify operations to record and/or output second content corresponding to the second subset of the second set of content items.

In various embodiments, the specifying the audiovisual pattern of intra-content metrics mapped to the content receiver may be further based at least in part on correlating the set of observation data with the first set of intra-content metrics and corresponding times corresponding to the detected content receiver operations. The detected content receiver operations may correspond to outputting particular content items of the first set of content items for display with a display device. In various embodiments, the specifying the second subset of the second set of content items may be to cause the content receiver to modify operations to output the second content corresponding to the second subset of the second set of content items at a selected time that is a function of the corresponding times.

In various embodiments, the modifying operations to record and/or output the content may include outputting a particular content item of the subset of the second set of content items as an initial program for display with a display device upon user activation of the content receiver after a period of inactivity of the content receiver. In various embodiments, the modifying operations to record and/or output the content may include selecting descriptive content indicative of a particular content item of the subset of the second set of content items. The modifying operations may further include outputting the descriptive content, in an electronic programming guide, to highlight the particular content item in the electronic programming guide.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
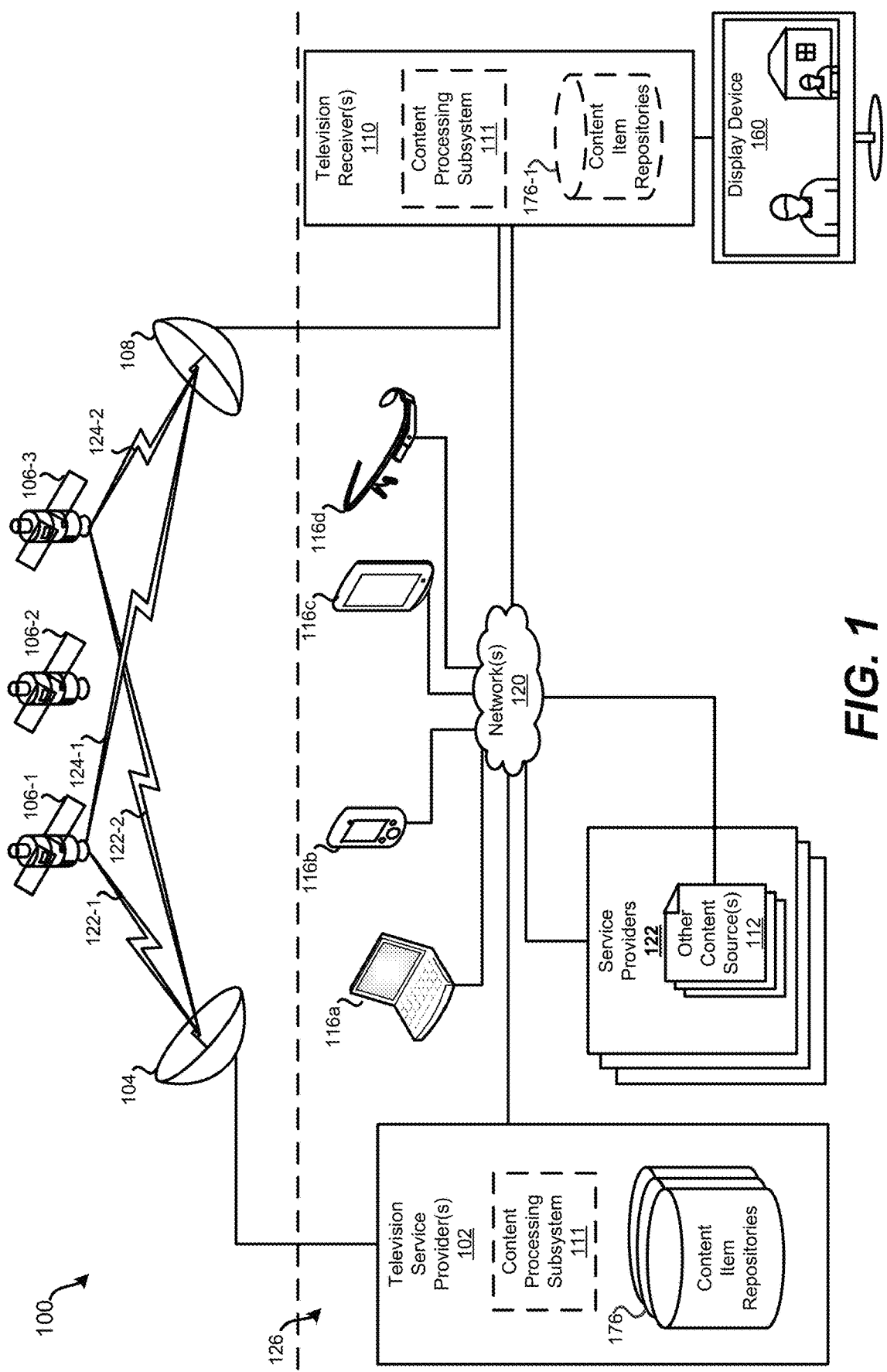
FIG. 1 illustrates an embodiment of a content distribution system, in accordance with various embodiments of the present disclosure.

FIG. 1 illustrates an embodiment of a content distribution system 100. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include television service provider system 102, satellite uplink 104, a plurality of orbiting (e.g., geosynchronous) satellites 106, satellite receiver 108, television receivers 110 (content receivers in accordance with embodiments disclosed herein), one or more contents sources 112 (e.g., online content sources), one or more catch-up services 114, one or more subscription services 116, one or more (other) television receivers 110-1, computing devices 116a-d, and service providers 122. As disclosed herein, the system 100 may transmit content items to television receivers 110 and computing devices 116a-d (which may be content receivers in accordance with embodiments disclosed herein). In various embodiments, content items may include movies and/or television programs, portions thereof, and/or commercials, one or a combination of which may be broadcast, transmitted on-demand, streamed, and/or downloaded.

In various embodiments, the television receiver 110 may include a content processing subsystem 111. Additionally or alternatively, the television service provider 102 may include a content processing subsystem 111. Additionally or alternatively, one or more service providers 122 may include a content processing subsystem 111. The content processing subsystem 111 may be configured to facilitate various content receiver control features in accordance with various embodiments disclosed herein.

The television service provider 102 may include one or more content item repositories 176. The television service provider 102 may store content items in a repository 176. The one or more content item repositories 176 may be implemented in various ways. For example, one or more data processing systems may store content items. One or more relational or object-oriented databases, or flat files on one or more computers or networked storage devices, may store content items. In various embodiments, a centralized system stores content items; alternatively, a distributed/ cloud system, network-based system, such as being implemented with a peer-to-peer network, or Internet, may store content items. In various embodiments, the content items may include particularized content items that correspond to audiovisual advertisements particularized to certain products and/or services. In various embodiments, the advertisements may correspond to commercials to be presented during commercial breaks of television programming and/or as an inset presentation within or otherwise in conjunction with the EPG when the television receiver 110 outputs the EPG for viewing.

The television service provider 102 may provide the content items to the television receiver 110 as part of a data transfer that is sent through the satellite 106. In various embodiments, the television receiver 110 may receive a downlinked satellite signal that includes the data for particularized content items transferred on a designated line in the vertical blanking interval (VBI) or other portion of the broadcast service transmission that does not interfere with other transmitted content. Additionally or alternatively, the television service provider 102 may provide particularized content items and/or other content items to the television receiver 110 via the one or more data networks 120. The television receiver 110 may store content items, such as particularized content items, in a content item repository 176 included in the television receiver 110 or otherwise local to the television receiver 110.

The television service provider system 102 and satellite transmitter equipment (which may include the satellite uplink 104) may be operated by a television service provider. A television service provider may distribute television channels, on-demand programming, programming information, and/or other services to users via satellite. The television service provider system 102 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the television service provider system 102 to one or more satellites 106. While a single television service provider system 102 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

System 100 may include one or more networks 120 that can be used for a bi-directional communication path for data transfer with television receivers 110 and other components of system 100. The network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

The television receivers 110, as described throughout, may generally be any type of television receiver (such as an STB (set-top box), for example) configured to decode signals received for output and presentation via a display device 160. In another example, television receiver 110 (which may include another remote television receiver, such as a television receiver 110-1) may be integrated as part of or into a television, a DVR, a computing device, such as a tablet computing device, or any other computing system or device, as well as variations thereof. In various embodiments, a television receiver 110 may be a component that is added into the display device 160, such as in the form of an expansion card. A television receiver 110 and network 120 together with television receivers 110 and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 160, computing devices 116, etc. are illustrated in FIG. 1, it should be understood that multiple (e.g., tens, thousands, millions) instances of such equipment, corresponding to various users in various geolocations, may be included the system 100.

In various embodiments, broadcast television programs and/or other content items may be delivered from the television service provider system 102 to television receivers, including a television receiver 110, via satellite according to a schedule. On-demand content items and/or other content items may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the television service provider 102 via the satellites 106. For example, the satellite receiver 108 may be configured to receive particular transponder streams as downlink signals 124, from one or more of the satellites 106. Based at least in part on the characteristics of a given television receiver 110 and/or satellite receiver 108, it may only be possible to capture transponder streams from a limited number of transponders of the satellites 106 concurrently. For example, a tuner of the television receiver 110 may only be able to tune to a single transponder stream from a transponder of a single satellite, such as the satellite 106-1, at a time.

The television receiver 110, which may be communicatively coupled to the satellite receiver 108, may subsequently select, via a tuner, decode, and relay television programming (content items) to a television for display thereon. Broadcast television programming or content may be presented "live," or from a recording as previously stored on, by, or at the television receiver 110. For example, an HD channel may be output to a television by the television receiver 110 in accordance with the HDMI/HDCP content protection technologies. Other embodiments are possible. For example, in various embodiments, an HD channel may be output to a television in accordance with the MoCA® (Multimedia over Coax Alliance) home entertainment networking standard. Other embodiments are possible.

The television receiver 110 may select via tuner, decode, and relay particular transponder streams to one or more of television receivers 110, which may in turn relay particular transponder streams to one or more display devices 160, 160-1. For example, the satellite receiver 108 and the television receiver 110 may, respectively, be configured to receive, decode, and relay at least one television channel to a television by way of a television receiver 110. Similar to the above example, a television channel may generally be presented "live," or from a recording as previously stored by the television receiver 110, and may be output to the display device 160 by way of the television receiver 110 in accordance with a particular content protection technology and/or networking standard. Other embodiments are possible.

In various embodiments, the content resources 126 may be used to provide the television receiver 110 with content items (e.g., television programming). The content resources 126 may be used to retrieve television programs or portions of television programs following and/or during a live broadcast of the television programs. The content resources 126 may include the television service provider 102, the service providers 122, the online content sources 112, one or more other television receivers, and/or the like.

The television service provider 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the television service provider 102 via the network 120. For instance, the television service provider 102 may be permitted to transmit a portion of a television program or an entire television program during and/or after a time at which the television program was broadcast live by the television service provider via a satellite-based television programming distribution arrangement.

As disclosed herein, the television service provider 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the television receiver 110, a user of the television receiver 110 may at least need to agree to payment of the fee. On-demand content provided via the satellite-based distribution arrangement may be stored locally by the television receiver 110 to allow on-demand access. On-demand content may also be retrieved via the network 120 from the television service provider 102.

The computing devices 116*a*-*d* represent various computerized devices that may be associated with a user of the television receiver 110 and that may be configured to facilitate various content discovery features disclosed in various embodiments herein. As indicated by 116*a*, the computing devices 116*a*-*d* may include a laptop computer, a desktop computer, a home server, or another similar form of computerized device. As indicated by 116*b* and 116*c*, the computing devices 116*a*-*d* may include a cellular phone and/or smartphone, a tablet computer, or another similar form of mobile device. As indicated by 116*d*, the computing devices 116*a*-*d* may include smart glasses or another similar form of wearable computing device.

The television receiver 110 may be provided with access credentials that allow access to content stored and/or accessible through one or more of the computing devices 116*a*-*d*. It should be understood that computing devices 116*a*-*d* are exemplary in nature. Content may be accessible through a fewer or greater number of computerized devices associated with a user of the television receiver 110.

In various embodiments, the online content sources 112 may represent content resources through which television programs (content items) may be retrieved by the television receiver 110 via the network 120. Television programming available through the online content sources 112 may be available for free and not require subscription (a username and/or password may or may not be necessary). Each of the online content sources 112 may represent different websites available via the Internet. For example, some television programming may be legally made available for free (such as television programming provided by government-funded sources, e.g., the BBC or Hulu®). Periodically, the television receiver 110 may poll online content sources 112 to determine which television programs are available and/or which television programs are scheduled to be available in the future. In various embodiments, the television receiver 110 may poll online content sources 112 regarding the availability of at least a portion of a specific television program.

FIG. 1 illustrates example aspects of a satellite-based television channel distribution system. Again, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems.

Thus, while network configuration data may be broadcast repeatedly via satellite to television receivers, it should be understood that a similar arrangement may be used in cable-based television programming broadcast networks to broadcast network configuration. For either type of network, various other forms of data may be transmitted via an Internet-based network 120 connection rather than using the television service provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

Figure 2:
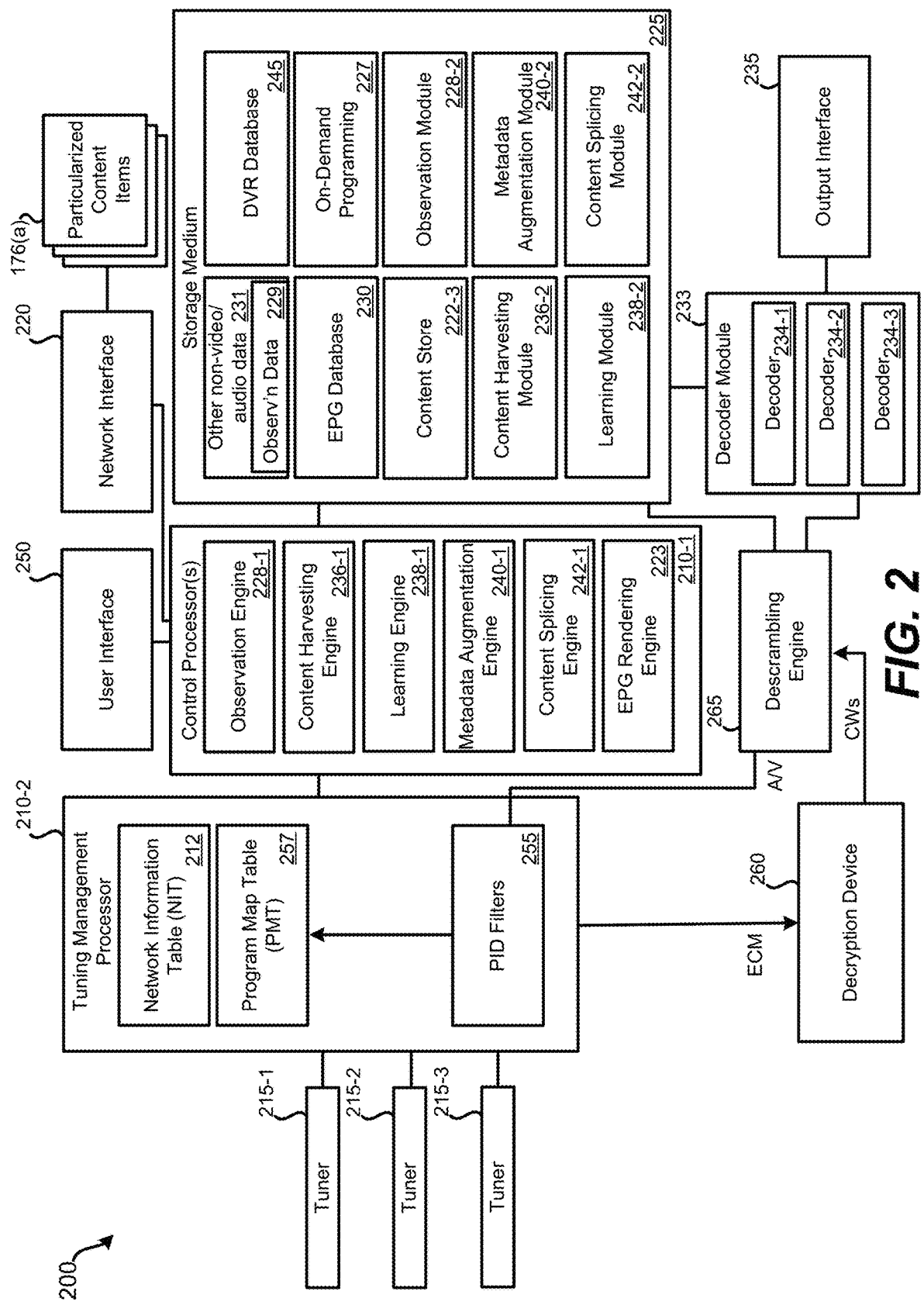
FIG. 2 illustrates a content receiver that makes use of, interacts with, and/or at least partially includes the content processing subsystem, in accordance with various embodiments of the present disclosure.

FIG. 2 illustrates a content receiver 200 that makes use of, interacts with, and/or at least partially includes the content processing subsystem 111, in accordance with various embodiments of the present disclosure. Various embodiments of the receiver 200 may include set top boxes (STBs), television receivers, and over-the-top receivers. The receiver 200 may represent receiver 110 of FIG. 1 and may be in the form of a STB that communicates with a display device such as a television. In various embodiments, in addition or in alternative to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). Hence, the receiver 200 may be incorporated as part of the display device 160 of FIG. 1.

For brevity, the receiver 200 is depicted in a simplified form, and may generally include more or fewer elements or components as desired in accordance with the present disclosure. The receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, networking information table (NIT) 212, digital video recorder (DVR) database 245, on-demand programming 227, content store 222-2, user interface 250, decryption device 260, decoder module 233, interface 235, and/or descrambling engine 265. The receiver 200 may include one or a combination of a access observation engine 228-1, a harvesting engine 236-1, a learning engine 238-1, a content augmentation engine 240-1, and/or a content splicing engine 242-1 may be provided in conjunction with a viewer observation module 213-2, a content harvesting module 236-2, a learning module 238-2, a content augmentation module 240-2, and/or a content splicing module 242-2 to implement various functionalities of the content processing subsystem 111 into the receiver 200. In other embodiments of receiver 200, fewer or greater numbers of components may be present. It should be understood that the various components of receiver 200 may be implemented using hardware, firmware, software, and/or some combination thereof. Functionality of components may be combined. For example, functions of descrambling engine 265 may be performed by tuning management processor 210-2. Further, functionality of components may be spread among additional components; for example, PID filters 255 may be handled by separate hardware from program map table 257. The receiver 200 may be in data communication with service providers, such as by way of network interface 220.

The processors 210 may include those configured to perform processes such as tuning to a particular channel, accessing and displaying EPG information from the EPG database 230, and/or receiving and processing input from a user. For example, the processors 210 may include one or more processors dedicated to decoding video signals from a particular format, such as MPEG, for output and display on a television and for performing decryption, if required. It should be understood that the functions performed by various modules of FIG. 2 may be performed using one or more processors. As such, for example, functions of the descrambling engine 265 may be performed by the control processor 210-1.

The control processor 210-1 may communicate with tuning management processor 210-2. The control processor 210-1 may control the recording of television channels based at least in part on timers stored in the DVR database 245. The control processor 210-1 may also provide commands to the tuning management processor 210-2 when recording of a television channel is to cease. In addition to providing commands relating to the recording of television channels, the control processor 210-1 may provide commands to the tuning management processor 210-2 that indicate television channels to be output to the decoder module 233 for output to a display device. The control processor 210-1 may also communicate with the network interface 220 and the user interface 250. The control processor 210-1 may handle incoming data from network interface 220, including network transport streams received from over-the-top service providers. The control processor 210-1 may handle incoming data from the network interface 220, including network transport streams received from the user interface 250, which may include user input received by way of one or more human interface devices. Additionally, the control processor 210-1 may be configured to output data via the network interface 220. The control processor 210 may also be configured to perform image and audio analyses to identify intra-content metrics disclosed herein.

The tuners 215 may include one or more tuners used to tune to transponders that include broadcasts of one or more television channels that may be received from a satellite or cable system, for example. In the illustrated embodiment of receiver 200, three tuners are present (tuner 215-1, tuner 215-2, and tuner 215-3). In other embodiments, two or more than three tuners may be present, such as four, six, or eight tuners. Each tuner contained in the tuners 215 may be capable of receiving and processing a single transponder stream from a satellite transponder at a given time, for example. As such, a single tuner may tune to a single transponder stream at a given time. If the tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 215 may be used to receive the signal containing the multiple television channels for presentation and/or recording. The tuners 215 may receive commands from the tuning management processor 210-2. Such commands may instruct the tuners 215 which frequencies are to be used for tuning.

The network interface 220 may be used to communicate via an alternate communication channel with a television service provider, if such communication channel is available. The primary communication channel may be via satellite (which may be unidirectional to the receiver 200) and the alternate communication channel (which may be bidirectional) may be via a network, such as the Internet. Referring back to FIG. 1, receiver 110 may be able to communicate with television service provider system 102 via a network 120, such as the Internet. This communication may be bidirectional: data may be transmitted from the receiver 110 to the television service provider system 102 and from the television service provider system 102 to the receiver 110. Referring again to FIG. 2, the network interface 220 may be configured to communicate via one or more networks, such as the Internet, to communicate with television service provider system 102 of FIG. 1. Other information may be transmitted and/or received via the network interface 220 such as content items (television programs, movies, video clips, particularized content items 176(a) and/or the like), information indicative of content characteristics and/or categories, observation data corresponding to indications of detected content receiver operations associated with a content receiver and mapped to a first set of content items, intra-content metrics of content items, specifications of audiovisual pattern of intra-content metrics, commands and/or specifications of content receiver operations, and/or the like.

The storage medium 225 may represent one or more non-transitory computer-readable storage mediums. The storage medium 225 may include memory and/or a hard drive. The storage medium 225 may be used to store information received from one or more satellites and/or information received via the network interface 220. The storage medium 225 may store information related to the EPG database 230, other non-video/audio data 231, DVR database 245, on-demand programming 227, observation module 228-2, the content harvesting module 236-2, the learning module 238-2, the content augmentation module 240-2, and/or the content splicing module 242-2. Recorded television programs may be stored using the storage medium 225 as part of the DVR database 245. The storage medium 225 may be partitioned or otherwise divided (such as into folders) such that predefined amounts of the storage medium 225 are devoted to storage of television programs recorded due to user-defined timers and stored television programs recorded due to provider-defined timers.

The EPG database 230 may store information related to television channels and the timing of programs appearing on such television channels. The EPG database 230 may be stored using the storage medium 225, which may be a hard drive. Information from the EPG database 230 may be used to inform users of what television channels or programs are recommended for the user based at least in part on the user's access patterns with respect to previously accessed content items, intra-content metrics of the previously accessed content items, and correlating the access patterns and intra-content metrics to other content items not previously accessed by the user. Information from the EPG database 230 may provide the user with a visual interface displayed by a television that allows a user to browse and select television channels and/or television programs for viewing and/or recording. Information used to populate the EPG database 230 may be received via the network interface 220 and/or via satellites, such as the satellite 106 of FIG. 1 via the tuners 215. For instance, updates to the EPG database 230 may be received periodically via satellite. The EPG database 230 may serve as an interface for a user to control DVR functions of the receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command. In various embodiments, content items may be selected, based at least in part on characteristics and/or categories of the last content viewed/presented, and presented in conjunction with the EPG. For example, particularized content items 176(*a*) could pertain to recommendations of programming (e.g., previews) and/or commercial advertisements. Hence, seamless transitioning features may extend to EPG views in various embodiments.

In addition to being used to provide users with information about scheduled programming, information from the EPG database 230 may be used to determine when television programs begin and end for the purposes of recording. For instance, when a channel-specific file is recorded that contains multiple television channels, the start and end of time of specific television programs within the channel-specific file may be based at least in part on the start and end times indicated in the EPG database 230. Other data may be stored within the EPG database 230 that may be useful in managing channel-specific files, such as series identifiers and episode identifiers, which may be used by a television service provider to identify particular television programs and alternative viewing options for content items matching personalized pattern data disclosed herein.

The decoder 233 may serve to convert encoded video and audio into a format suitable for output to a display device. For instance, the decoder 233 may receive MPEG video and audio from the storage medium 225, or the descrambling engine 265, to be output to a television. MPEG video and audio from the storage medium 225 may have been recorded to the DVR database 245 as part of a previously-recorded television program. The decoder 233 may convert the MPEG video and audio into a format appropriate to be displayed by a television or other form of display device and audio into a format appropriate to be output from speakers, respectively.

The network information table (NIT) 212 may store information used by the receiver 200 to access various television channels. The NIT 212 may be stored locally by a processor, such as the tuning management processor 210-2 and/or by the storage medium 225. Information used to populate the NIT 212 may be received via satellite (or cable) through the tuners 215, may be received via the network interface 220, such as from the television service provider. As such, information present in the NIT 212 may be periodically updated. In various embodiments, NIT 212 may be locally stored by the receiver 200 using the storage medium 225. Generally, the NIT 212 may store information about a service provider network, such as a satellite-based service provider network. Information that may be present in the NIT 212 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In various embodiments, the NIT 212 may contain additional data or additional tables may be stored by the receiver. For example, while specific audio PIDs and video PIDs may not be present in the NIT 212, a channel identifier may be present within the NIT 212 which may be used to look up the audio PIDs and video PIDs in another table, such as a program map table (PMT). In various embodiments, a PID associated with the data for the PMT is indicated in a separate table, program association table (PAT), which is not illustrated in FIG. 2. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, the NIT 212 and/or the PMT 257 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In various embodiments, supplemental audio content is transmitted using the same transponder stream as the television channel or content to which the supplemental audio content corresponds. In various embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based at least in part on information in the NIT, it may be possible to determine the proper satellite and transponder to which to tune for a particular television channel, or to determine the proper antenna and frequency to which to tune to for a particular television channel. In various embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of the storage medium 225 may be devoted to storage of television programming, a portion may be devoted to storage of non-audio/video data, such as the EPG database 230 and other non-video/audio data 231. This "other" data may permit the receiver 200 to function properly. In various embodiments, at least ten gigabytes are allocated to such other data. For example, if the NIT 212 is stored by the storage medium 225, it may be part of the other non-video/audio data 231.

The decoder module 233 may serve to convert encoded video and audio into a format suitable for output to a display device. For instance, the decoder module 233 may receive MPEG video and audio from the storage medium 225, the network interface 220, or the descrambling engine 265 to be output to a television. MPEG video and audio from the storage medium 225 may have been recorded to the DVR database 245 as part of a previously recorded television program. The decoder module 233 may convert the MPEG video and audio into a format appropriate to be displayed by a television or other form of display device and audio into a format appropriate to be output from speakers, respectively. The decoder module 233 may have the ability to convert a finite number of television channel streams received from the storage medium 225, the network interface 220, or the descrambling engine 265 simultaneously. For instance, each of the decoders 234 within the decoder module 233 may be able to only decode a single television channel at a time.

While a television channel is being decoded by a decoder of the decoders 234, the television channel is not necessarily output to a display device via the television interface 235. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of the decoder module 233 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to the television interface 235, may be controlled by the control processor 210-1, or some other processor. While the decoder module 233 is illustrated as having three decoders 234 (decoder 234-1, decoder 234-2, and decoder 234-3), in other embodiments, a greater or fewer number of decoders may be present in the receiver 200.

The television interface 235 may serve to output a signal to a television (or another form of display device) in a proper format for display of video and playback of audio. As such, the television interface 235 may output one or more television channels, stored television programming from the storage medium 225 (e.g., television programs from the DVR database 245, television programs from on-demand programming 227 and/or information from the EPG database 230) to a television for presentation.

The tuning management processor 210-2 may be in communication with the tuners 215 and the control processor 210-1. The tuning management processor 210-2 may be configured to receive commands from the control processor 210-1. Such commands may indicate when to start/stop recording a television channel and/or when to start/stop causing a television channel to be output to a television. The control processor 210-1 and the tuning management processor 210-2 may be configured to perform content receiver biasing operations disclosed herein.

Digital Video Recorder (DVR) functionality may permit a television channel to be recorded for a period of time. DVR functionality of the receiver 200 may be managed by the control processor 210-1. The control processor 210-1 may coordinate the television channel, start time, and stop time of when recording of a television channel is to occur. In various embodiments, particularized content items 176(a) could be selected (based at least in part on intra-content metrics and viewing pattern features disclosed herein) and inserted into the presentation stream prior to during recording, and/or upon playback of the recording. The DVR database 245 may store information related to the recording of television channels. The DVR database 245 may store timers that are used by the control processor 210-1 to determine when a television channel should be tuned to and its programs recorded to the DVR database 245 of storage medium 225. In various embodiments, a limited amount of the storage medium 225 may be devoted to the DVR database 245. Timers may be set by the television service provider and/or one or more users of the receiver 200.

User profiles may also be stored in the storage medium 245 and may include stored user preferences that may be inferred by the television receiver 200 based at least in part on personalized pattern data. The television receiver 200 may communicate user profile information to the service provider 102, 122 to request particularized content items 176(a) tailored to the inferred user preferences made with respect to augmented content in accordance with various embodiments disclosed herein. The user profiles may include profiles for multiple users or may include a single profile for the television receiver in general. In various embodiments, the user profiles may include preferences for content receiver biasing operations disclosed herein.

The on-demand programming 227 may represent additional television programming stored by the storage medium 225. The on-demand programming 227 may include television programming that was not recorded to the storage medium 225 via a timer (either user- or provider-defined). Rather, on-demand programming is programming provided to the receiver directly for storage by the receiver and for later presentation to one or more users. In various embodiments, particularized content items 176(a) could be selected (based at least in part on intra-content metrics and viewing pattern features disclosed herein) and inserted into the presentation stream prior to or upon playback of the recording.

The user interface 250 may include a remote control (physically separate from the receiver 200) and/or one or more buttons on the receiver 200 that allow a user to interact with the receiver 200. The user interface 250 may be used to select a television channel for viewing, view information from the EPG database 230, and/or program a timer stored to DVR database 245, wherein the timer is used to control the DVR functionality of the control processor 210-1. The user interface 250 may also be used to transmit commands to the receiver 200 and make user selections to customize user preferences, select on-demand programming, etc.

Referring back to the tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 215 is receiving data from a particular transponder of a satellite, the transponder stream may be a series of data packets corresponding to multiple television channels. Each data packet may contain a packet identifier (PID), which, in combination with the NIT 212 and/or the PMT 257, may be determined to be associated with a particular television channel. Particular data packets, referred to as entitlement control messages (ECMs), may be periodically transmitted. ECMs may be associated with another PID and may be encrypted; the receiver 200 may use the decryption device 260 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 260 for decryption.

The decryption device 260 may be a removable or non-removable smart card. When the decryption device 260 receives an encrypted ECM, the decryption device 260 may decrypt the ECM to obtain some number of control words. In various embodiments, from each ECM received by the decryption device 260, two control words are obtained. In various embodiments, when the decryption device 260 receives an ECM, it compares the ECM to the previously received ECM. If the two ECMs match, the second ECM is not decrypted because the same control words would be obtained. In other embodiments, each ECM received by the decryption device 260 is decrypted; however, if a second ECM matches a first ECM, the outputted control words will match; thus, effectively, the second ECM does not affect the control words output by the decryption device 260. The decryption device 260 may be permanently part of the receiver 200 or may be configured to be inserted and removed from the receiver 200. In various embodiments, the control processor 210-1, the tuning management processor 210-2, or other hardware may be able to determine that a received ECM has not changed from the previous iteration, and therefore not provide the repeated ECM to the smart card, since the same control word(s) will be obtained.

The tuning management processor 210-2 may be in communication with the tuners 215 and the control processor 210-1. The tuning management processor 210-2 may be configured to receive commands from the control processor 210-1. Such commands may indicate when to start/stop recording a television channel and/or when to start/stop causing a television channel to be output to a television. The tuning management processor 210-2 may control the tuners 215. From the tuners 215, the tuning management processor 210-2 may receive transponder streams of packetized data. From the network interface 220, the tuning management processor 210-2 may receive network transport stream of packetized data. As previously detailed, some or all of these packets may include a PID that identifies the content of the packet.

The tuning management processor 210-2 may be configured to create one or more PID filters 255 that sort packets received from the tuners 215 and/or the network interface 220 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 212 or another table, such as a program association table (PAT). From the PMT data packets, PMT may be constructed by the tuning management processor 210-2.

The PID filters 255 may be configured to filter data packets based at least in part on PIDs. In various embodiments, the PID filters 255 are created and executed by the tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 257 may store the particular assignments of PIDs for individual television channels. For example, if a transponder data stream includes multiple television channels, data packets corresponding to a television channel that is not desired to be stored or displayed by the user may be ignored by the PID filters 255 and not routed to the descrambling engine 265, the decryption device 260, or the control processor 210-1. As such, only data packets corresponding to the one or more television channels desired to be stored and/or displayed may be filtered and passed to either the descrambling engine 265 or the decryption device 260; other data packets may be ignored. For each television channel, a stream of video packets, a stream of audio packets (one or both of the audio programs), a stream of supplemental audio content, and/or a stream of ECM packets may be present, each stream identified by a PID. In various embodiments, a common ECM stream may be used for multiple television channels. Additional data packets corresponding to other information, such as updates to the NIT 212, may be appropriately routed by the PID filters 255. At a given time, one or multiple PID filters may be executed by the tuning management processor 210-2.

The descrambling engine 265 may use the control words output by the decryption device 260 in order to descramble video and/or audio corresponding to television channels for storage and/or presentation. Video and/or audio data contained in the transponder data stream received by the tuners 215 may be scrambled. Video and/or audio data may be descrambled by the descrambling engine 265 using a particular control word. Which control word output by the decryption device 260 to be used for successful descrambling may be indicated by a scramble control identifier present within the data packet containing the scrambled video or audio. Descrambled video and/or audio may be output by the descrambling engine 265 to the storage medium 225 for storage (in the DVR database 245) and/or to the decoder module 233 for output to a television or other presentation equipment via the television interface 235.

As disclosed above, the control processor 210-1 may have the access observation engine 228-1 that is configured to facilitate identification, aggregation, consolidation, and qualification of viewer data pertinent to users of the television receiver 110 in accordance with various embodiments disclosed herein. The access observation engine 228-1 may be configured with logic to process, analyze, retrieve, pull, cause transmission of, derive, compile, aggregate, categorize, characterize, rank, handle, store, report, and/or present any suitable information/content pertaining to viewers—e.g., implicit content ratings derived from histories and patterns of content receiver operations responsive to user selections. The content receiver operations may include outputting content items for display, recording content items, and/or deleting recorded content items—which operations may be mapped, for example, to one or a combination of viewing, recording, recording then viewing, recording but not viewing, viewing percentages of individual content items (e.g., how much of a program/movie did the viewer actually watch), deleting recordings, pausing play of a content item then subsequently resuming playing of the content item, category and/or keyword searches for content items with a search functionality (e.g., a search engine provided via the EPG), and/or explicit content ratings input by viewers with respect to content items.

In various embodiments, the access observation engine 228-1 may be configured to cause viewer observation data to be transmitted to the service provider system 102 for analysis to for intelligent encoding adjustments based at least in part on viewer. Such information may be provided to a television service provider via network interface 206. Additionally or alternatively, in various embodiments, viewer observation data may be stored in an observation data store 229 of the television receiver 110.

The control processor 210-1 may have an EPG rendering engine 223 that may be configured to cause an EPG to be output that is based at least in part on data from EPG database 210 and information about the availability of at least portions of television programs via alternative viewing options. The television receiver 110 may receive communications from the service provider 102 about alternative viewing options. Responsive to such communications (e.g., data and/or metadata specifying the alternative viewing options for a given program), the control processor 210-1 may control presentation attributes and options for the alternative viewing options for particular television programs indicated in a presented EPG, such as graphical/descriptive indicia and user-selectable options for the programs.

In various embodiments, the access observation engine 228-1 may be configured to generate user interfaces that allow a user to provide feedback on specific content that a user liked or disliked. The access observation engine 228-1 may be configured to solicit and process feedback received from a user for content items that are recommended, biased, highlighted, and/or the like in accordance with embodiments disclosed herein. For example, the access observation engine 228-1 may be configured to present information and user-selectable options to allow for user profile creation, profile modification, content rating, and/or the like. The access observation engine 228-1 may be configured to process selections and other input in response to such options.

For simplicity, the receiver 200 of FIG. 2 has been reduced to a block diagram; commonly known parts, such as a power supply, have been omitted. Further, some routing between the various modules of the receiver 200 has been illustrated. Such illustrations are for exemplary purposes only. The state of two modules not being directly or indirectly connected does not indicate the modules cannot communicate. Rather, connections between modules of the receiver 200 are intended only to indicate possible common data routing. It should be understood that the modules of the receiver 200 may be combined into a fewer number of modules or divided into a greater number of modules.

Further, the components of the television receiver 200 may be part of another device, such as built into a television. The television receiver 200 may include one or more instances of various computerized components, such as disclosed in relation to computer systems disclosed further herein. While the television receiver 200 has been illustrated as a satellite receiver, it is to be appreciated that techniques below may be implemented in other types of television receiving devices, such as cable receivers, terrestrial receivers, IPTV receivers or the like. In various embodiments, the television receiver 200 may be configured as a hybrid receiving device, capable of receiving content from disparate communication networks, such as satellite and terrestrial television broadcasts. In various embodiments, the tuners may be in the form of network interfaces capable of receiving content from designated network locations.

Figure 3:
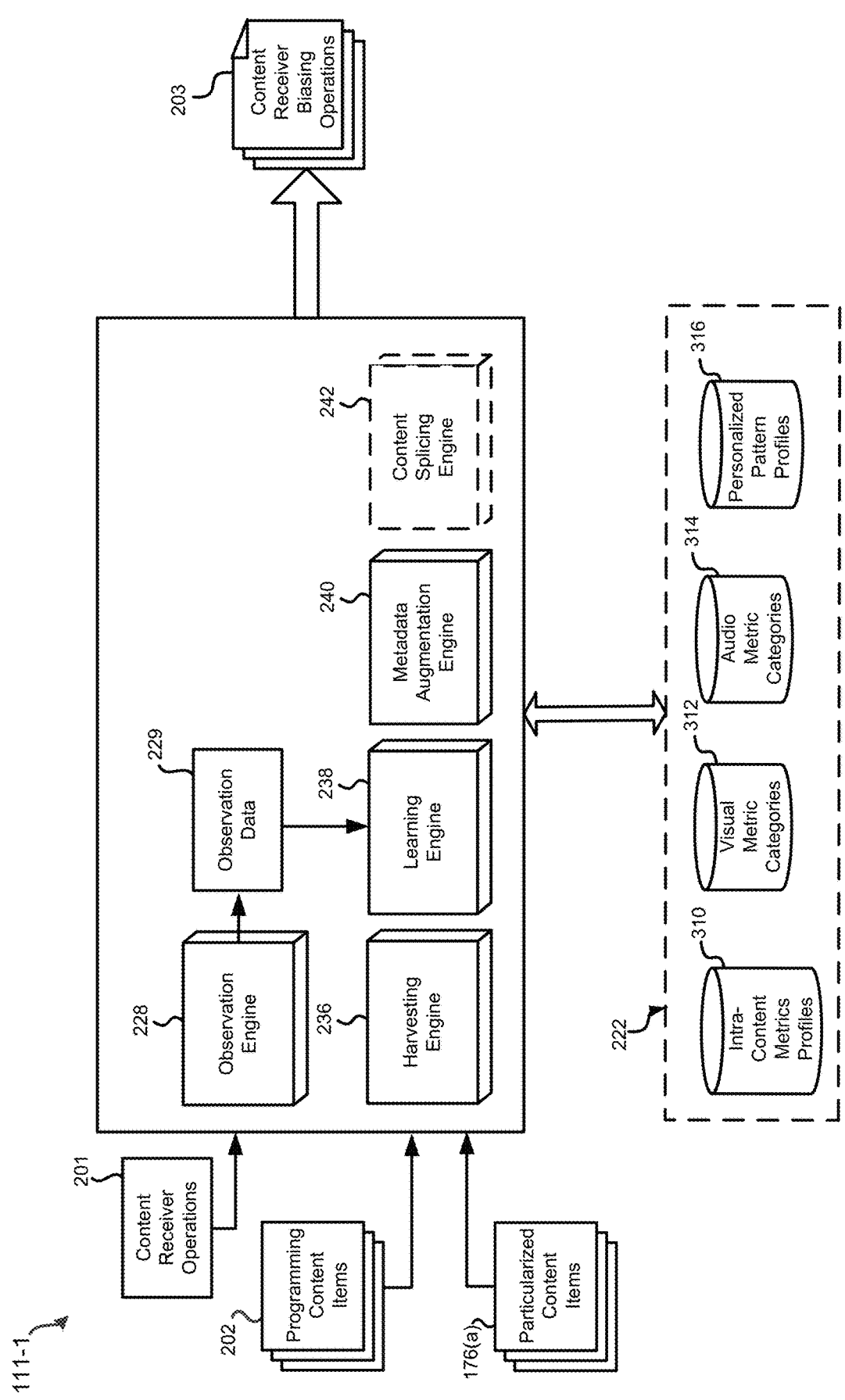
FIG. 3 illustrates a functional diagram of the content processing subsystem, in accordance with various embodiments of the present disclosure.

FIG. 3 illustrates a functional diagram of the content processing subsystem 111, in accordance with various embodiments of the present disclosure. In various embodiments, the content processing subsystem 111 may be included in the end-user system and may be included in the television receiver 110. Thus, for example, the receiver 200 may include one or a combination of the harvesting engine 236-1, the learning engine 238-1, the content augmentation engine 240-1, and/or the content splicing engine 242-1 in conjunction with the content harvesting module 236-2, the learning module 238-2, the content augmentation module 240-2, and/or the content splicing module 242-2 to implement various functionalities of the content processing subsystem 111 as depicted in FIG. 2. However, in various embodiments, the content processing subsystem 111 may be included in the television service provider system 102 and/or one or more other service providers 122. Moreover, in various embodiments, the content processing subsystem 111 may be separate from, and provide content to, the television service provider system 102. In various embodiments, various features of the content processing subsystem 111 may be distributed between the television receiver 110 and upstream of the television receiver 110.

As depicted, the content processing subsystem 111 includes a content processing subsystem 111. The content processing subsystem 111 may include or otherwise correspond to an artificial-intelligence-based (AI-based) subsystem that includes an audiovisual control engine with highly sensitive image and audio processors. The AI-based subsystem may include the access observation engine 228 and may accordingly be configured to facilitate identification, aggregation, consolidation, and qualification of viewer data pertinent to users of the television receiver 110. Hence, the AI-based subsystem may be configured to process, analyze, retrieve, pull, cause transmission of, derive, compile, aggregate, categorize, characterize, rank, handle, store, report, and/or present any suitable information/content pertaining to viewers. The access observation engine 228 may be configured to detect content receiver operations 201. In various embodiments where the access observation engine 228 is integrated with the content receiver, the access observation engine 228 may detect content receiver operations 201 directly. In other embodiments where the access observation engine 228 is separate from the content receiver (e.g., when the access observation engine 228 is remote from the content receiver, as when the access observation engine 228 is implemented upstream of the content receiver at the service provider 102), the access observation engine 228 may receive signals from the content receiver that are indicative of content receiver operations 201 responsive to user selections. Such signals may be sent on a real-time basis, on a periodic basis, or on an occasional event-triggered basis, such as when the content receiver is powered up or powered down.

Figure 4:
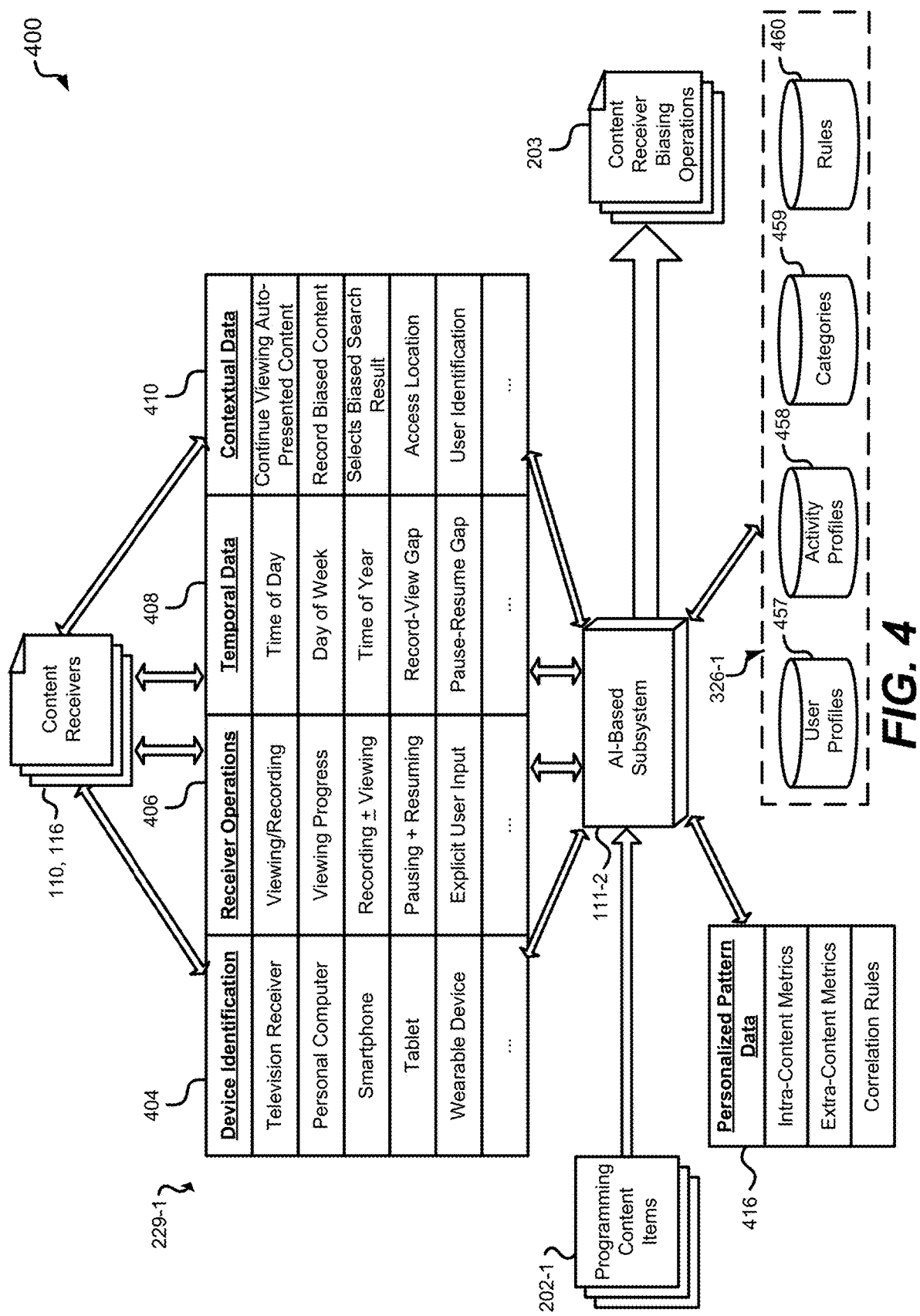
FIG. 4 illustrates certain aspects of the AI-based subsystem data flow, in accordance with various embodiments of the present disclosure.

FIG. 4 illustrates certain aspects of the AI-based subsystem data flow 400, in accordance with various embodiments of the present disclosure. The content processing subsystem 111 may be configured to gather observation data 229-1, which may be specific to one or more particular identified users and/or may be generally related to particular content receivers 110, 116. The observation data 229-1 may be gathered from one or more content receivers 110, 116, aggregated, consolidated, and transformed into personalized pattern profiles 316 that include personalized pattern data 416.

In embodiments where the content processing subsystem 111 is included in a content receiver, the content receiver is a self-observer that may additionally gather additional observation data 229-1 from one or more other content receivers 110, 116. In various embodiments, the data from the one or more content receivers 110, 116 may be retrieved and/or received by the content processing subsystem 111 via one or more data acquisition interfaces, which may include interfaces of the content processing subsystem 111, the one or more content receivers 110, 116, and/or the like—through network(s) 120 in various embodiments, through any suitable means for direct communication, and/or through any other suitable means of transferring data. According to various embodiments, data may be actively gathered and/or pulled from the one or more content receivers 110, 116.

In various embodiments, the one or more data acquisition interfaces may include one or more application programming interfaces (APIs) that define protocols and routines for interfacing with the one or more content receivers 110, 116. The APIs may specify application programming interface (API) calls to/from one or more content receivers 110, 116. In various embodiments, the APIs may include a plug-in to integrate with an application of one or more content receivers 110, 116. The one or more data acquisition interfaces, in various embodiments, could use a number of API translation profiles configured to allow interface with the one or more additional applications of the one or more content receivers 110, 116 to access data (e.g., a database or other data store) of the data sources. The API translation profiles may translate the protocols and routines of the data source component and/or system to integrate at least temporarily with the system and allow communication with the system (one-way communication to the system and/or two-way communication with system in various embodiments) by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The observation data 229-1 may include content items 202-1 that have been subject to operations of the one or more content receivers 110, 116 responsive to user input. Hence, the content items 202-1 may correspond to content items that a user has previously accessed (e.g., viewed, recorded, etc.) and/or has specified for access (e.g., content items selected for recording). Further, the observation data 229-1 may include one or a combination of various extra-content metrics mapped to the content items 202-1.

The observation data 229-1 may include extra-content metrics corresponding to device identification data 404, such as information to facilitate detection, recognition, and differentiation of any one or combination of television receivers, personal computers (e.g., laptops, desktops), smart phones, tablets, wearable computing/communication devices, and/or the like. The observation data 229-1 may include extra-content metrics corresponding to the content receiver operation identification data 406, may include outputting content items for display, recording content items, deleting recorded content items, such as information to facilitate detection, recognition, and differentiation of any one or combination of outputting content items for display, recording content items and setting recordings of content items, instances of outputting recorded content items for display (i.e., a viewer actually watching recorded content), viewing percentages of individual content items (e.g., how much of a program/movie did the viewer actually watch), instances of unplayed recorded content items (i.e., when a viewer does not watch recorded content items), deleting recordings without having played the recordings, instances of pausing play of a content item then resuming or not resuming playing of the content item, category and/or keyword searches for content items with a search functionality (e.g., a search engine provided via the EPG), explicit content ratings input by viewers with respect to content items, and/or the like.

The observation data 229-1 may include extra-content metrics corresponding to temporal data 408, such as any information to facilitate detection, recognition, and differentiation of one or combination of temporal factors correlated or which the content processing subsystem 111 correlates to other observation data 229-1, such as the device identification data 404, the content receiver operation identification data 406, contextual data 410, and/or the like. For instance, the temporal data 408 may include time of day information, time of week information, time of year information, holiday information, durations between recording particular content items and viewing the recorded content items, durations between pausing play of particular content items and resuming play of the content items, and/or the like.

The observation data 229-1 may include extra-content metrics corresponding to contextual data 410, which may include viewer responses to content item biasing. For example, viewer responses to content item biasing may include indications of whether the viewer continues to watch automatically played content items beyond a threshold duration, or to completion or substantial completion of the automatically played content items. As disclosed herein, an automatically played content item may correspond to a channel which the content processing subsystem 111 selects for playing upon initialization/powering on of the content receiver. As another example, viewer responses to content item biasing may include indications of whether the viewer selects a highlighted or recommended content item for viewing and/or recording. As yet another example, viewer responses to content item biasing may include indications of whether the viewer selects for viewing and/or recording a content item that is biased in a set of search results provided responsive to a user search. Based at least in part on taking into account such contextual data 410 as part of a feedback loop, the learning engine 238 may employ an ongoing learning mode to confirm, correct, and/or refine determinations made for the personalized pattern data 416 for particular viewers or content receivers generally. The feedback could be used for training the system to heuristically adapt conclusions, profiles, correlations, attributes, triggers, patterns, and/or the like.

The contextual data 410 may include location data, such as any information to facilitate detection, recognition, and differentiation of one or combination of locations of the devices when particular content items are viewed, particular content items are specified for recording, and/or when other content receiver operations are executed. In various embodiments, a service provider or other data source may facilitate locating a user of a mobile communication device, for example, by use GPS coordinates, cellular tower triangulation techniques, Wi-Fi-based location information, carrier-provided location information, and/or other location determination systems to identify a location of the device and/or that the user is currently using a particular device. The contextual data 410 may include user identification information. A user may be identified via user login information, user selection of particular profiles, and/or by mapping an account holder to one or more devices.

Accordingly, the content processing subsystem 111 may map one or a combination of various extra-content metrics of the observation data 229-1 to the content items 202-1. For instance, the content processing subsystem 111 may observe a particular identified device being used for a particular receiver operation with respect to a particular content item at a particular time and within a particular context. The content processing subsystem 111 may observe numerous instances of such extra-content metrics mapped to particular content items and may develop personalized pattern data 416 based at least in part on correlating the extra-content metrics to intra-content metrics of the particular content items. The content processing subsystem 111 may be configured to employ machine learning to process the observation data 229-1 and the content items 202-1 and derive the personalized pattern data 416. The content processing subsystem 111 may be configured to employ deep learning to process the observation data 229-1 and the content items 202-1 and derive the personalized pattern data 416.

Referring again to FIG. 3, the content processing subsystem 111 may include a learning engine 238 that may be an analysis engine that employs machine learning. The learning engine 238 may further employ deep learning. Accordingly, the learning engine 238 may facilitate machine learning or, more specifically, deep learning, to facilitate creation, development, and/or use of personalized pattern data 416. The learning engine 238 may be configured to perform any one or combination of features directed to matching or otherwise correlating the observation data 229-1—such as the device identification data 404, the content receiver operation identification data 406, the temporal data 408, the contextual data 410, descriptive information of the content items 202, and/or the like—with intra-content metrics of the content items 202. The learning engine 238 may include a reasoning module to make logical inferences from a set of the detected and differentiated data to infer one or more patterns of activity for particular viewers and/or content receivers generally. A pattern-based reasoner could be employed to use various statistical techniques in analyzing the data in order to infer personalized pattern data 416 from the observation data 229-1. A transitive reasoner may be employed to infer relationships from a set of relationships related to the observation data 229-1. In various embodiments, the system automatically establishes and develops the personalized pattern data 416. However, the personalized pattern data 416 may be set up and/or tailored by users. With various embodiments, the personalized pattern data 416 may be automatically established and developed by the system.

The content processing subsystem 111 may be communicatively coupled with interface components and communication channels (e.g., of the television receiver 110, which may take various forms in various embodiments as disclosed herein) configured to receive programming content 202, which may correspond to content items such as movies, television programs, portions thereof, etc. The programming content 202 may include audiovisual content broadcast and/or otherwise transmitted by the television service provider 102 and/or one or more other service providers 122, one or more recordings of such content for later play-back, and/or on-demand content provided by the television service provider 102 and/or one or more other service providers 122. The programming content 202 may include various components, including without limitation, one or more video tracks, audio tracks, metadata tracks, close captioning information, and/or the like. In various embodiments, the content processing subsystem 111 may retain received programming content 202 in one or more content repositories (not shown). The content repositories may include any suitable form of storage media, such as any suitable form disclosed herein. The content processing subsystem 111 may be further configured to receive other types of content items, such as particularized content items 176(*a*) (e.g., recommendations of programming, such previews and trailers, and/or commercial advertisements).

The content processing subsystem 111 may include the harvesting engine 236 configured to aggregate content items (programming content 202 and/or particularized content items 176(*a*)) in order to facilitate content receiver control features disclosed herein. In various embodiments, the harvesting engine 236 may be configured to receive, pull, process, buffer, organize, rank, and/or store programming content 202 and/or particularized content items 176(*a*). In various embodiments, the harvesting engine 236 may likewise aggregate the content receiver operations 201. In various embodiments, the observation engine 228 and the harvesting engine 236 may be integrated.

In various embodiments, the content items may include audiovisual content broadcast and/or otherwise transmitted by the television service provider 102 and/or one or more other service providers 122. In various embodiments, the content items may be pushed and/or otherwise transmitted by the television service provider 102 and/or one or more other service providers 122 to the television receiver 111. In addition or in alternative, content items may be pulled by the television receiver 111 (e.g., by the harvesting engine 236) from the television service provider 102 and/or one or more other service providers 122.

The learning engine 238 may include logic to implement and/or otherwise facilitate any taxonomy, classification, categorization, correlation, mapping, qualification, scoring, organization, and/or the like features disclosed herein. In various embodiments, the learning engine 238 may be configured to analyze, classify, categorize, characterize, tag, and/or annotate programming content 202 and/or particularized content items 176 (*a*). The learning engine 238 may identify intra-content metrics of content items 202 that are the subject of receiver operations 406. The learning engine 238 may employ one or more artificial intelligence (machine learning or, more specifically, deep learning) algorithms to perform pattern matching to detect patterns of intra-content metrics of the content items 202. For example, as disclosed in further detail herein, the learning engine 238 may learn patterns of intra-content metrics corresponding to visual characteristics of the content items such as one or a combination of colors and any visual metric based at least in part on color—e.g., aggregate color palette, color palette as a function of time of the show, lighting, changes in lighting throughout a show, scene types (e.g., sky shots, locations, such as beaches, mountains, etc.), close-ups, camera-angles, cinematography, closeness/zoom level, objects recognized in a show, static/moving cameras/characters, transitions between scenes (e.g., abrupt or smooth), pace of show, objectionable content, and/or the like. These different visual metric types may be bases for various visual metric categories 312. Ranges of visual metric values for these different visual metric types may be mapped to visual metric categories 312.

Additionally, the learning engine 238 may learn patterns of intra-content metrics corresponding to audio characteristics of the content items such as one or a combination of dialogue, length of dialogues (e.g., monologues), inter-dialogues, space between two dialogues, spaces between sounds, time scale (e.g., pace of dialogue), screams and peculiar sounds, ratio and positioning of male to female to child dialogues, music/background score, beats, vocabulary, profanity, slang, accent, such audio characteristics as a function of time of the show, and/or the like. These different audio metric types may be bases for various audio metric categories 314. Ranges of audio metric values for these different audio metric types may be mapped to audio metric categories 314.

For example, the content processing subsystem 111 (e.g., by way of the learning engine 238) may be configured to detect one or more color characteristics in programming content 202 and/or particularized content items 176(*a*). In various embodiments, the one or more color characteristics may include any one or combination of brightness, contrast, color temperature, tint, shade, colorfulness, chroma, intensity, saturation, and/or any suitable color characteristic for a video sequence that may be measured. The learning engine 238 may include an image analyzer and handling module to facilitate that detection. By way of further example, the learning engine 238 may detect one or more color characteristics in programming content 202 and/or particularized content items 176(*a*) by way of any one or combination of pixel identification, detecting color component values, detecting color codes, and/or the like.

The learning engine 238 may sum individual colors detected for a sample(s) of programming content 202 and/or a given particularized content item 176(*a*). The summing of the individual colors may include summing counts (e.g., pixel counts) of instances of color component values, color codes, and/or the like. In various embodiments, similar color component values, color codes, etc., may be grouped, for example, into color bands that encompass a range of similar colors with relatively slight variations. Hence, multiple similar colors, and counts thereof, may be correlated to a visual metric category 312 for the similar colors, to result in multiple visual metric categories 312. In such embodiments, the summing may include summing counts of instances of color component values, color codes, and/or the like in certain such groupings.

Based at least in part on the detection of visual characteristics, the learning engine 238 may create a visual metric profile for a given programming content item 202 and/or particularized content item 176(*a*). The visual metric profile could be retained in any suitable form, such as a file, a list, etc. The content processing subsystem 111 may store visual metric profiles mapped to programming content items 202 and/or particularized content items 176(*a*) in intra-content metrics profiles repositories 310. Each visual metric profile may specify one or more dominant visual metric and/or visual metric categories 312 as characteristics of the programming content item 202 and/or particularized content item 176(*a*). In various embodiments, determination of the dominant visual metrics and/or visual metric categories 312 may be based at least in part on relative percentages with respect to all detected visual metric or visual metric categories 312. In various embodiments, determination of the dominant visual metric and/or visual metric categories 312 may be based at least in part on ranking the counts of colors and/or color categories 312. Selection of the dominant colors and/or color categories 312 may include selecting one or more top-ranked colors or color categories 312. Selection of one or more top-ranked colors and/or color categories 312 may be based at least in part on applying one or more thresholds to the summed color values and/or color categories 312. In various embodiments, a summed color and/or color category 312 having a majority, simple majority, relative majority, plurality, or otherwise of the counts for a given sample may be selected at the top-ranked color and/or color category. In various instances (e.g., when no color or color category 312 satisfies one of those predetermined thresholds of the counts for a given sample), multiple colors and/or color categories 312 may be selected as the top-ranked colors and/or color categories 312, with more colors and/or color categories 312 being selected the closer the counts are to one another.

The learning engine 238 may further employ image recognition algorithms in order to derive the various types of visual metrics and to correlate the visual metrics with visual metric categories 312. The image handling features of the learning engine 238 may perform correlation of images to reference images mapped to visual metric categories 312, which reference images may be available from a remote source and/or which may be stored in the repositories 222. The image data could include any suitable object, scene, aspect of a scene, and/or other visual characteristic qualifications in any suitable form for correlation based at least in part on a number of salient features of the object, scene, aspect of a scene, and/or other visual characteristic, and qualifications of the features. The reference image data may be refined over time as image baselines for a particular type of object, scene, aspect of a scene, and/or other visual characteristic are developed with additional image data analyses. The visual characteristics of an object may be identified at least in part by shape recognition of shapes corresponding to the object, scene, aspect of a scene, and/or other visual characteristic. The visual characteristics of an object may be identified at least in part by formatting, rescaling, cropping, and/or otherwise preparing images of the object, scene, aspect of a scene, and/or other visual characteristic (or portions of the images where the outer shapes are defined as boundaries) for further image processing. The learning engine 238 may link particular image data for an object, scene, aspect of a scene, and/or other visual characteristic to visual metric categories 312 with image data associated with objects, scenes, aspect of scenes, and/or other visual characteristics, to identify a known or new object, scene, aspect of a scene, and/or other visual characteristic. The reference image data may be refined over time as image baselines for particular objects, scenes, aspect of scenes, and/or other visual characteristics are developed with additional data analyses and captures.

Similarly, the content processing subsystem 111 (e.g., by way of the learning engine 238) may be configured to detect one or more audio characteristics in programming content 202 and/or particularized content items 176(*a*). The detection of audio characteristics may allow for characterization and matching of the programming content items 202 and/or particularized content items 176(*a*) based at least in part on audio characteristics of the programming content items 202 and/or particularized content items 176(*a*). In various embodiments, the learning engine 238 may include an audio analyzer and handling module to facilitate that detection. By way of example, the learning engine 238 may detect one or more audio characteristics in programming content 202 and/or particularized content items 176(*a*) by way of any one or combination of analyzing closed captioning information, analyzing audio, applying voice recognition, acoustic spectrum analysis, and/or the like.

The learning engine 238 may, in various embodiments, analyze the audio track to identify characteristics of a musical score of the sample. For example, the acoustic analysis may include analyzing and identifying the sample for acoustic characteristics such as frequencies, intensities, tones, pitches, and/or the like audio metrics (such as those disclosed above) over time. The learning engine 238 may select values of one or a combination of such acoustic metrics as distinctive markings and may compile the values as an acoustic impression for the purposes of characterizing the musical score of the sample. The acoustic impression may include a spectrum of frequencies in various embodiments. In some cases, the learning engine 238 may correlate the acoustic impression to one or more audio metric categories 314 for the similar acoustic impressions. In various embodiments, the correlation may be based at least in part on matching selected values of the acoustic metrics (e.g., distinctive values such as peaks, baselines, averages, etc.) to acoustic metric ranges of values specified for certain audio metric categories 314.

In various embodiments, the correlation may be based at least in part on matching selected values of the acoustic metrics to acoustic fingerprints of particular songs which are categorized as being in certain audio metric categories 314. Thus, various embodiments may identify particular songs and then an associated category 314 such as genre, mood, popularity ranking, recency of release, and/or the like. Additionally or alternatively, various embodiments may not identify particular songs (e.g., as a default or in particular cases where a musical score is not identifiable, such as an ad hoc musical score only for particular content), but may match selected values of the acoustic metrics to certain audio metric categories 314 of like acoustic metrics. Beyond metrics mapped to music/background score, the learning engine 238 may map audio metrics to other audio metric categories 314 such as those corresponding to spaces between sounds, screams and peculiar sounds, and/or the like.

Based at least in part on the acoustic impression, the learning engine 238 may create an audio metric profile for a given programming content item 202 and/or particularized content item 176(*a*). The audio metric profile may be retained in any suitable form, such as a file, a list, etc. The content processing subsystem 111 may store audio metric profiles mapped to particularized content items 176(*a*) in the intra-content metrics profiles repositories 310. Each audio metric profile may specify one or more selected values of audio metrics as distinctive markings and/or acoustic categories 314 as characteristics of the programming content item 202 and/or particularized content item 176(*a*).

The learning engine 238 may analyze the audio tracks metadata track, and/or close captioning information to identify dialogue as distinctive markings of the sample. The learning engine 238 may identify one or more keywords and/or expressions in the dialogue as a dialogue impression for the purposes of characterizing the sample. The learning engine 238 may compile the keywords and/or expressions of the sample and retain the keywords and/or expressions in the dialogue impression. In some cases, the learning engine 238 may correlate the dialogue impression to one or more audio metric categories 314 for similar dialogue impressions. In various embodiments, the correlation may be based at least in part on matching selected keywords and/or expressions to identical and/or similar keywords and/or expressions specified for certain dialogue categories 316. The dialogue categories 316 may include categorizations of concept, keyword, expression, mood, theme, emotion, length of dialogues (e.g., monologues), inter-dialogues, space between two dialogues, time scale (e.g., pace of dialogue), screams and peculiar sounds, ratio and positioning of male to female to child dialogues, vocabulary, profanity, slang, accent, and/or the like.

Based at least in part on the dialogue impression, the learning engine 238 may create a dialogue profile for a given particularized content item 176(*a*) and/or item of programming content 202. The dialogue profile may be retained in any suitable form, such as a file, a list, etc. The content processing subsystem 111 may store dialogue profiles mapped to programming content items 202 and/or particularized content items 176(*a*) in the intra-content metrics profiles repositories 310. Each dialogue profile may specify one or more selected keywords and/or expressions as distinctive markings and/or acoustic categories 314 as characteristics of the programming content item 202 and/or particularized content item 176(*a*).

In various embodiments, the content processing subsystem 111 may be configured to insert metadata into the data stream of programming content items 202 and/or into particularized content items 176(*a*). Various embodiments may include a metadata augmentation engine 340 to facilitate such features. The metadata augmentation engine 340, as with the other engines, may include instructions retained in a computer-readable media and to be executed by one or more processors. The metadata augmentation engine 340 may be upstream of a television receiver, for example, at a service provider 102 or 112. Likewise, one or more of the other portions of the content processing subsystem 111 may be upstream at a service provider. In other embodiments, the one or more portions, or all, of the content processing subsystem 111 may be included in a television receiver 110.

Various embodiments may take various sizes of samples of the programming content 202 and/or particularized content items 176(*a*). Thus, various embodiments may only analyze one or more portions of a given particularized content item 176(*a*) and/or programming content 202. For example, various embodiments may only analyze a first portion of a given particularized content item 176(*a*) (e.g., the first X number of seconds of the content item according to presentation time), whereas various embodiments may analyze the entire particularized content item 176(*a*). Likewise, various embodiments may only analyze an end portion of an item of programming content 202 (e.g., the last X number of seconds of the segment according to presentation time prior to transition to a commercial break), whereas various embodiments may analyze the entire item of programming content 202. Additionally or alternatively, various embodiments may only analyze a beginning portion of an item of programming content 202 (e.g., the first X number of seconds of the segment according to presentation time just after a commercial break).

Additionally or alternatively to temporal limitations on sample sizes, various embodiments may employ frame type limitations on sample size. As an example, while various embodiments may analyze all frames of a particularized content items 176(*a*) and/or an item of programming content 202, other embodiments may only analyze base frames (e.g., I-frames) and not delta frames (e.g., P-frames and B-frames). Conversely, various embodiments may only analyze delta frames (e.g., P-frames and/or B-frames) and not base frames (e.g., I-frames). Various embodiments may dynamically determine whether to analyze base frames or delta frames based at least in part on applying threshold to the amount of pixel changes corresponding to the delta frames. Hence, various embodiments may analyze delta frames only if the pixel changes of the delta frames are extensive enough to satisfy the threshold (which may correspond to a pixel count and/or relative percentage with respect to entire frame). By way of example, various embodiments may analyze delta frames only if the pixel changes of the delta frames correspond to at least 33 percent of the frame.

Various embodiments may vary the extent of sampling for a particularized content item 176(*a*) and/or an item of programming content 202. For example, various embodiments may employ greater sampling upfront and lesser sampling near the end of presentation of the particularized content items 176(*a*). For example, various embodiments may sample all frames for the first X seconds of the particularized content items 176(*a*), then downshift to sampling only I-frames for the balance of the particularized content items 176(a). Similarly, various embodiments may sample all I-frames for the first X seconds of the particularized content items 176(a), then downshift to sampling only a subset of I-frames for the balance of the particularized content items 176(a). Still other embodiments may employ greater sampling of an initial portion and an end portion of the particularized content items 176(a), while employing lesser or no sampling in the middle of the presentation of the particularized content items 176(a). Hence, various embodiments may focus sampling near transitions to and/or from particularized content items 176(a) to other content items (whether it is another particularized content items 176(a) or the programming content item 202).

Similarly, with respect to a programming content item 202, various embodiments may employ greater sampling closer to transition points (i.e., an end portion before a commercial break and/or an initial portion after a commercial break) and lesser sampling for portions further the transition points. For example, various embodiments may sample only I-frames for X seconds of the programming content item 202 before a transition point, then upshift to sampling all frames for the last Y seconds before the transition point. Likewise, various embodiments may sample all frames for the first X seconds of the programming content item 202 after a transition point, and then downshift to sampling only I-frames for another Y seconds after that. Various embodiments may employ greater sampling of an initial portion and an end portion of the programming content item 202, while employing lesser or no sampling in the middle of the presentation of the item of programming content 202.

Various embodiments may sample only portions of images, such as only part of a frame (which could, for example, be specified by identification of pixel coordinates and ranges thereof to define areas of interest). Various embodiments may sample only a central portion of a frame. Other embodiments may only sample a non-central portion, such as a border portion of a frame. Various embodiments may start with one portion of a frame and only sample to an extent to satisfy a threshold. For example, the threshold could be certain percentage of the frame. Various embodiments may apply different or the same sampling techniques to programming content items 202 and particularized content items 176(a).

In various embodiments, to detect the one or more audio characteristics, the learning engine 238 may analyze the sample that the learning engine 238 analyzes for visual characteristics. In various embodiments, the learning engine 238 may analyze a different size of sample than that which it analyzes for visual characteristics. For example, in various embodiments, the learning engine 238 may audio analyze a sample of X seconds before or after a transition point, whereas the learning engine 238 may visually analyze a smaller sample of Y seconds before or after the transition point. Thus, the audio sample could be longer and overlap the visual sample in various embodiments, and vice versa in other embodiments. Further, visual analysis may be employed when audio analysis is not employed in various embodiments and vice versa in various embodiments. For example, one or both of visual matching and audio matching may be applied for a transition to a commercial break, whereas a different one or combination of visual matching and audio matching may be applied for a transition at the end of the commercial break.

Having generated, developed, and/or otherwise used the intra-content metrics 310 and categories 312, 314 to develop the personalized pattern profiles 316, the learning engine 238 may use the personalized pattern data 416 to identify matching programming content items 202-1 and/or particularized content items 176(a)-1. The identification may be based at least in part on metadata at a service provider system or at client-side television receiver 110. The learning engine 238 may perform a search of the repositories 222-1 for content items that have metadata matching the personalized pattern data 416, with the highest preference given to the content item that has metadata most closely matching the personalized pattern data 416.

Having identified one or more closely matching content items, the subsystem 112 may specify one or more content receiver biasing operations 203 to bias the content receiver towards the one or more closely matching content items. The content receiver biasing operations 203 may include specifying a matching content item for playing upon initialization/powering on of the content receiver. Thus, for example, the content receiver may be instructed to initially tune to a channel that is playing the matching content item so that the content item is automatically played upon initialization/powering on of the content receiver. In some embodiments, such a matching content item may be specified in advance of the initialization/powering on. The subsystem 112 may anticipate time periods and corresponding matching content items based at least in part on the personalized pattern data 416. For example, the subsystem 112 may utilize patterns of viewing of certain types of content at certain times to anticipate likely future viewing times by specifying matching content items for automatic playing at those likely future viewing times. The subsystem 112 may create a schedule of various likely future viewing times and corresponding matching content items for automatic playing. The content receiver may be instructed to utilize schedule to effect the automatic playing of the matching content items. In other embodiments, the subsystem 112 may perform the matching and specification of matching content items for automatic playing in real time upon initialization/powering on the content receiver.

The content receiver biasing operations 203 may include highlighting a matching content item using any suitable graphical indicia. For example, a matching content item may be highlighted and emphasized more than other content item options in an electronic programming guide. Descriptive content may be selected for presentation in order to highlight the matching content item. A greater amount of descriptive content may be presented for the matching content item than other content item options in the electronic program guide. The descriptive content may include an indication that the matching content item is recommended for the viewer, and may indicate a basis for the recommendation such as, "If you liked X, you may want to watch Y." As other examples of highlighting a matching content item, pop-ups or banners may be used to indicate a recommendation of the matching content item with user-selectable options to view and/or record the matching content items.

The content receiver biasing operations 203 may include biasing the matching content item when a viewer is using a search functionality of the content receiver so that the matching content item is top-ranked or otherwise highly ranked in the search results. In such instances, the matching content item may be identified based at least in part on the search query in addition to the personalized pattern data 416. As another example of the content receiver biasing operations 203, one or more matching content items may be automatically specified for recording by the DVR. Listings of the recorded matching content items may be highlighted and emphasized more than other recorded content items with any suitable graphical indicia and descriptive content.

The content receiver biasing operations 203 may include seamless flow content splicing. For example, one or a combination of the content splicing features of U.S. patent application Ser. No. 15/589,202, filed May 8, 2017, and entitled "Systems and Methods for Facilitating Seamless Flow Content Splicing," may be implemented in conjunction with embodiments disclosed herein. That application, U.S. patent application Ser. No. 15/589,202, is incorporated by reference herein in its entirety for all purposes.

Figure 5:
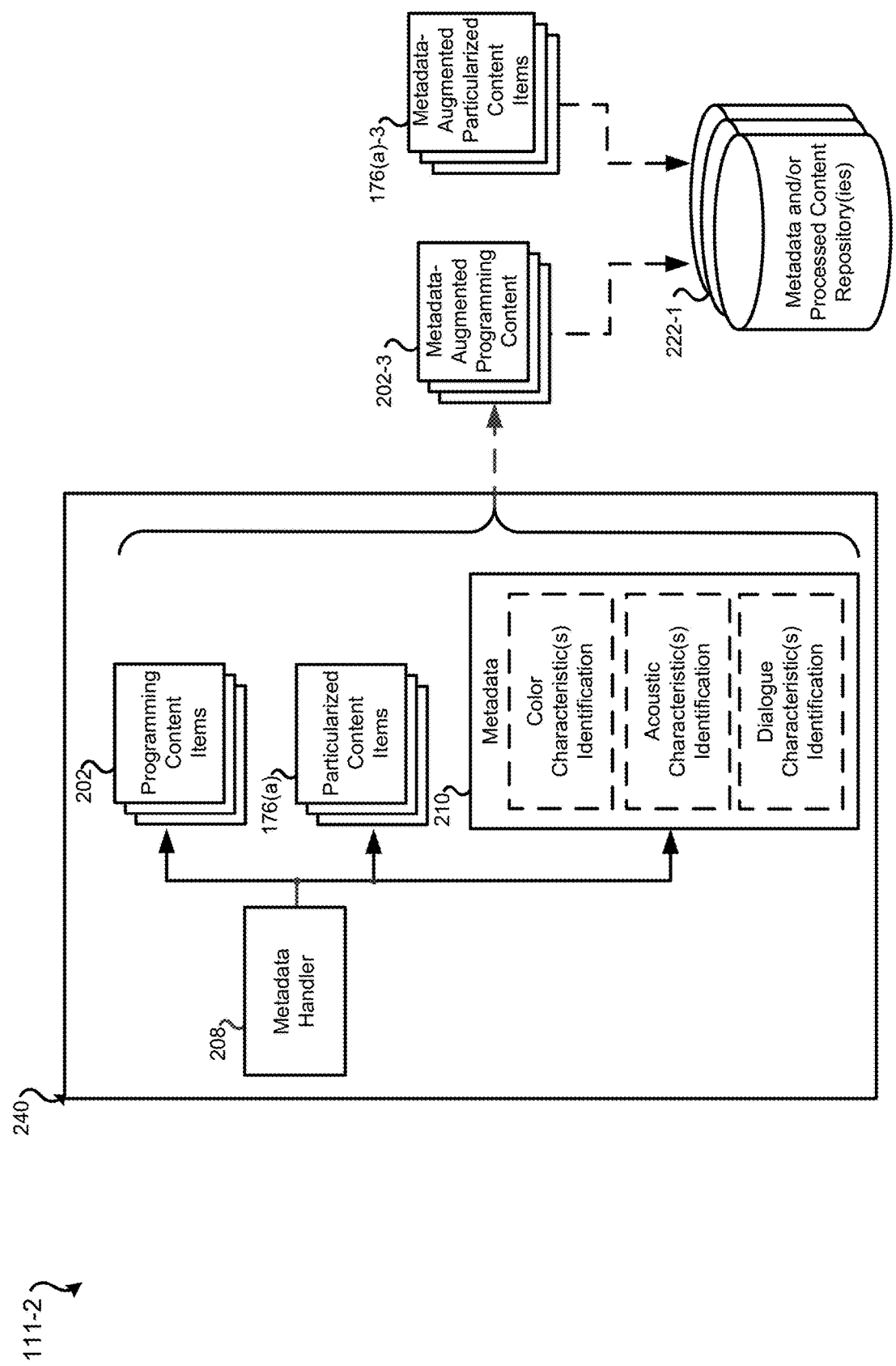
FIG. 5 is a simplified illustration of a portion of the content processing subsystem with metadata augmentation features, in accordance with various embodiments of the present disclosure.

FIG. 5 is a simplified illustration of a portion of the content processing subsystem 111-2 with metadata augmentation features, in accordance with various embodiments of the present disclosure. While not all components of subsystem 111-1 are shown in FIG. 5, the content processing subsystem 111-2 may include one or a combination of such components. As disclosed above, the learning engine 238 may identify one or more intra-content metrics and/or categories of the programming content items 202 and/or particularized content items 176 (a). Based at least in part on such identification, the metadata augmentation engine 240 may create metadata 208, which, in various embodiments, may correspond to tag data. Hence, the metadata augmentation engine 240 may process programming content items 202 and/or particularized content items 176 (a) and provide tagged programming content items 202-1 and/or tagged particularized content items 176 (a)-1.

The metadata augmentation engine 240 may include a metadata handler 208 that may generate metadata 210 (e.g., one or more tags 210) corresponding to the characteristics and/or categories. In various embodiments, the metadata 210 may be inserted into the output programming content items 202 and/or output particularized content items 176(a). In various embodiments, the one or more tags 210 may not be inserted into the programming content items 202 and/or particularized content items 176(a) but may be sent with the output programming content items 202 and/or output particularized content items 176. For example, metadata augmentation engine 240 may assign packet identifiers to identify data of the content that is to be transmitted as part of a data stream to a television receiver and that is to be associated with one or more tags. In any case, the content processing subsystem 111-2 may output metadata-augmented programming content items 202-1 and/or metadata-augmented particularized content items 176(a)-1. In various embodiments, the metadata-augmented programming content items 202-1 and/or metadata-augmented particularized content items 176(a)-1 may be stored at least temporarily in one or more repositories 222. In various embodiments, tag data may be stored at least temporarily in one or more repositories 222.

Data transmitted as part of a data stream to a television receiver may be packetized and assigned packet identifiers. A particular packet identifier may be associated with data packets related to tags for metadata-augmented programming content items 202-1, metadata-augmented particularized content items 176(a)-1, and/or particular segments thereof. Tag data may include or otherwise be associated with a tag identifier and may include intra-content metric and/or category identifiers. Tag data may include an indication of a period of time (or other measure of time, e.g., a number of frames), a start frame, an end frame, and/or the like.

In various embodiments utilizing such metadata or not utilizing such metadata, the learning engine 238 may be configured to identify content items (programming content items 202 and/or particularized content items 176(a)) having intra-content metrics matching the personalized pattern data 416. The learning engine 238 may be further configured to identify content items having intra-content metrics and/or availabilities (e.g., playing or scheduled at particular times, and/or available on-demand) matching the personalized pattern data 416 including temporal access patterns. The learning engine 238 may perform correlation based at least in part on correlation rules that govern correlation of the personalized pattern data 416 to content items based at least in part on intra-content metrics and availabilities of the content items. In various embodiments, the correlation may be based at least in part on the intra-content metrics profiles of the content items. In various embodiments, the correlation may be based at least in part on visual metric categories 312 and/or audio metrics categories 314 of the content items.

In various embodiments in addition or in alternative, sets of content items may be transmitted to the television receiver 111 in batches. For example, sets of content items may be transmitted to the television receiver 111 on a periodic or otherwise scheduled basis. In various embodiments in addition or in alternative, sets of content items may be transmitted to the television receiver 111 on an as-needed basis when the television receiver 111 is receiving programming content 202, is scheduled to receive programming content 202, and/or is predicted to receive programming content 202 based at least in part on a detected pattern of past viewing of previous programming content 202 at certain times and on certain days. In various embodiments, sets of content items may be selected (e.g., by the service provider(s)) for particular time periods and may be transmitted to the television receiver 111 with an assignment (e.g., by way of tag data or other metadata) for the designated time period. Additionally or alternatively, in various embodiments, sets of content items may be selected (e.g., by the service provider(s)) for particular channels and/or television programs and may be transmitted to the television receiver 111 with an assignment (e.g., by way of tag data or other metadata) for the designated channel(s) and/or television program(s).

Additionally or alternatively, in various embodiments, sets of content items may be selected (e.g., by the service provider(s)) as tailored for particular viewing habits and learned interests of viewers based at least in part on the personalized pattern data 416. As disclosed in more detail herein, the television receiver 110 (which may include the learning engine 238) may determine intra-content metrics for content items that the viewer actually views and/or records. The television receiver 110 may push information indicating such intra-content metrics and/or categories to one or more service providers 102 and/or 122. The service providers 102, 122 may select sets of content items matching the intra-content metrics and/or categories for transmission to the television receiver 110. The television receiver 110 may select from the sets of content items as matching the personalized pattern data 416. In some embodiments, the television receiver 110 may utilizing the content splicing engine 242 may output the selected content items for display at particular times corresponding to the personalized pattern data 416.

The correlation rules may include correlation criteria that could include intra-content metrics specifications. By way of example, color specifications may be identified by any one or combination of values and/or identifiers of color characteristics or components, ranges of the values or identifiers, specifications of complimentary range or groupings, and/or like color correlation information. In addition or in alternative, the correlation rules may include correlation criteria that could include keywords identified by any one or combination of words, word stems, phrase, word groupings, and/or like keyword information. In addition or in alternative, the correlation rules may include correlation criteria that could include acoustic specifications identified by any one or combination of values and/or identifiers of acoustic characteristics or components, ranges or groupings of the values or identifiers, specifications of complimentary range or groupings, and/or like acoustic correlation information. These examples with respect to color, dialogue, and acoustic intra-content metrics are illustrative and may be applied to other types of intra-content metrics.

The correlation criteria could include weightings assigned to visual metrics specifications, audio metrics specifications, and/or the like. For example, within each color, acoustic, and/or dialogue bucket, a color characteristic, keyword, and/or acoustic characteristic could be assigned a weight according to its significance. By way of example, brightness could be assigned a greater weight than contrast, acoustic genre could be assigned a greater weight than recency of release, and more significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Various embodiments may have characteristics and/or keywords organized according to decision tree, with contingencies so that only certain combinations of characteristics and/or keywords may be considered. For example, certain characteristics and/or keywords could only have significance if used in conjunction with other keywords, and/or not in conjunction with others. Again, these examples with respect to color, dialogue, and acoustic intra-content metrics are illustrative and may be applied to other types of intra-content metrics.

In various embodiments, the learning engine 238 may employ a scoring system to correlate the content items with the personalized pattern data 416. Various embodiments may quantify correlations with a numerical expression, for example, a match score, with higher scores being assigned to higher correlations of content items with the personalized pattern data 416. Higher scores may be assigned for greater extents of matching. For example, a match of three top-ranked intra-content metrics and/or categories of the content items may be assigned a higher score than a match of only one top-ranked intra-content metrics and/or category. As another example, an exact match of intra-content metrics and/or categories may be assigned a higher score than a complimentary match (e.g., where absent an exact match, one intra-content metrics and/or category is defined as a complement to another intra-content metrics and/or category). Hence, closeness of matching may be a basis for scoring.

Such examples may apply to various intra-content metrics correlations. For example, a match of three dialogue cues or dialogue categories of the content items may be assigned a higher score than a match of only one top dialogue cue and/or dialogue category. As another example, an exact match of words, expressions, and/or dialogue categories may be assigned a higher score than a complimentary match (e.g., where absent an exact match, a word, expression, and/or dialogue category is defined as a complement to another a word, expression, and/or dialogue category). Further, in like manner, such examples may apply to other types of intra-content metrics correlations.

Further, various embodiments may accord different weights to various intra-content metrics correlations. By way of example, various embodiments may accord a greater weight to color correlation than to acoustic correlation, and greater weight to acoustic correlation than to dialogue correlation. A high correlation may be identified using any suitable qualification scheme (e.g., a score threshold, a score ranking, etc.). Some contingencies could be implemented so that only a threshold correlation needs be identified. For example, if a sufficiently close match is found on the basis of one bucket (e.g., color correlation) to meet the threshold, the matching content item may be selected. But, if a sufficiently close match is found on that basis, one or more of the buckets may be used as a basis to identify a stronger pattern match.

In various embodiments, the content splicing engine 242 may include a multiplexer. The multiplexer may create a digital stream of data packets containing the video, audio, and, in various embodiments, the metadata to output the selected content items. In embodiments where the content splicing engine 242 is implemented at the service provider system 102, the multiplexed data stream may be transmitted on a particular transponder stream via a transponder of a satellite. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the television service provider 102. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

Figure 6:
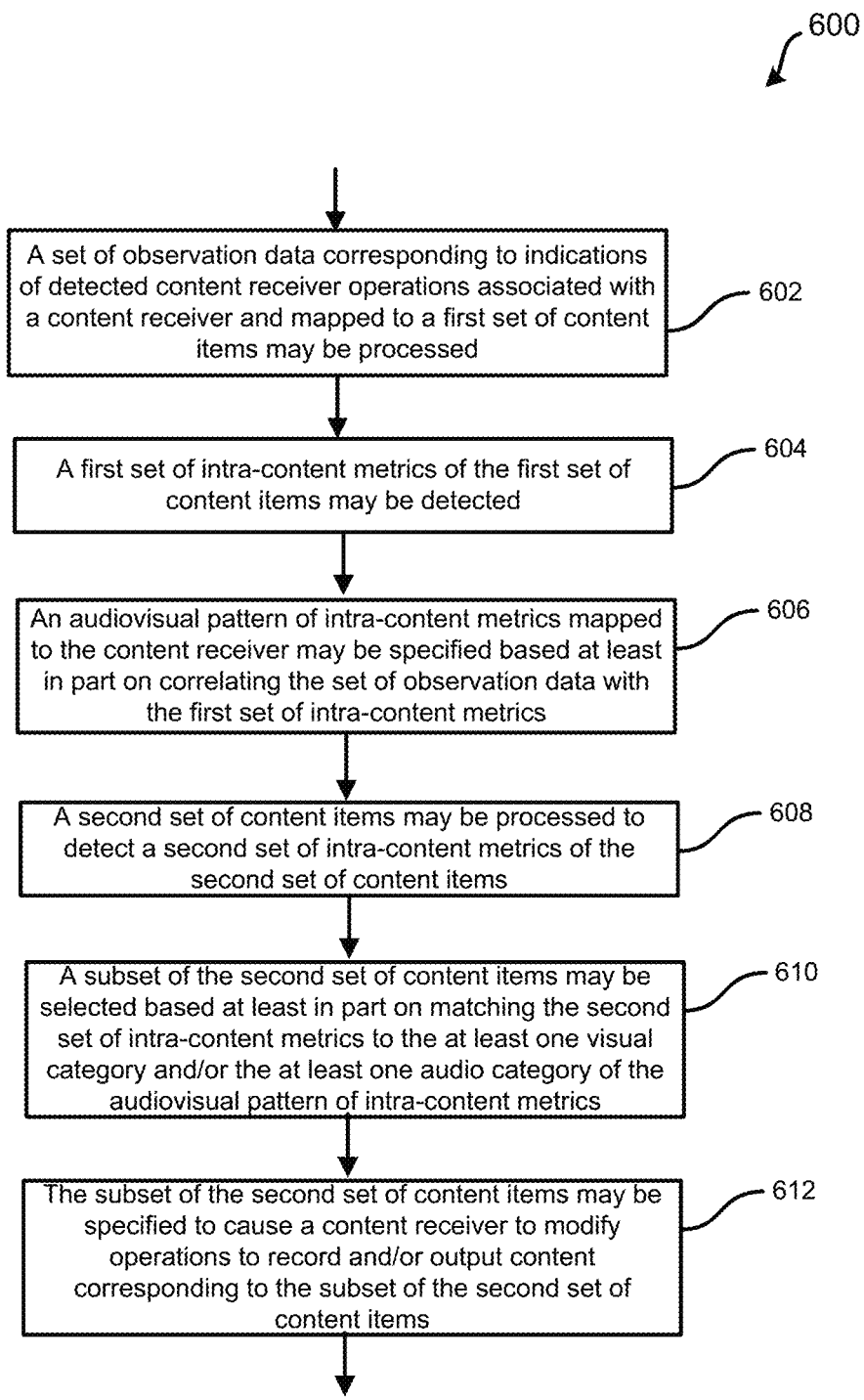
FIG. 6 is a block diagram that illustrates an example method of content receiver control for particularized output of content items based at least in part on intra-content metrics, in accordance with various embodiments of the present disclosure.

FIG. 6 is a block diagram that illustrates an example method 600 of content receiver control for particularized output of content items based at least in part on intra-content metrics, in accordance with certain embodiments of the present disclosure disclosed above. As indicated by block 602, a set of observation data corresponding to indications of detected content receiver operations associated with a content receiver and mapped to a first set of content items may be processed by a content processing system. The content processing system may include or otherwise correspond to the content processing subsystem 111.

As indicated by block 604, a first set of intra-content metrics of the first set of content items may be detected by the content processing system. The first set of intra-content metrics may include at least one visual characteristic and at least one audio characteristic for the first set of content items. The at least one visual characteristic may include at least one color characteristic of video content of the first set of content items.

As indicated by block 606, an audiovisual pattern of intra-content metrics mapped to the content receiver may be specified by the content processing system, based at least in part on correlating the set of observation data with the first set of intra-content metrics. The audiovisual pattern of intra-content metrics may include at least one visual category that includes the at least one visual characteristic and at least one audio category that includes the at least one audio characteristic. As indicated by block 608, a second set of content items may be processed by the content processing system to detect a second set of intra-content metrics of the second set of content items. The second set of content items may be specified to be available at one or more future times.

As indicated by block 610, a subset of the second set of content items may be selected, by the content processing system, based at least in part on matching the second set of intra-content metrics to the at least one visual category and/or the at least one audio category of the audiovisual pattern of intra-content metrics. As indicated by block 612, the subset of the second set of content items may be specified, by the content processing system, to cause a content receiver to modify operations to record and/or output content corresponding to the subset of the second set of content items.

Figure 7:
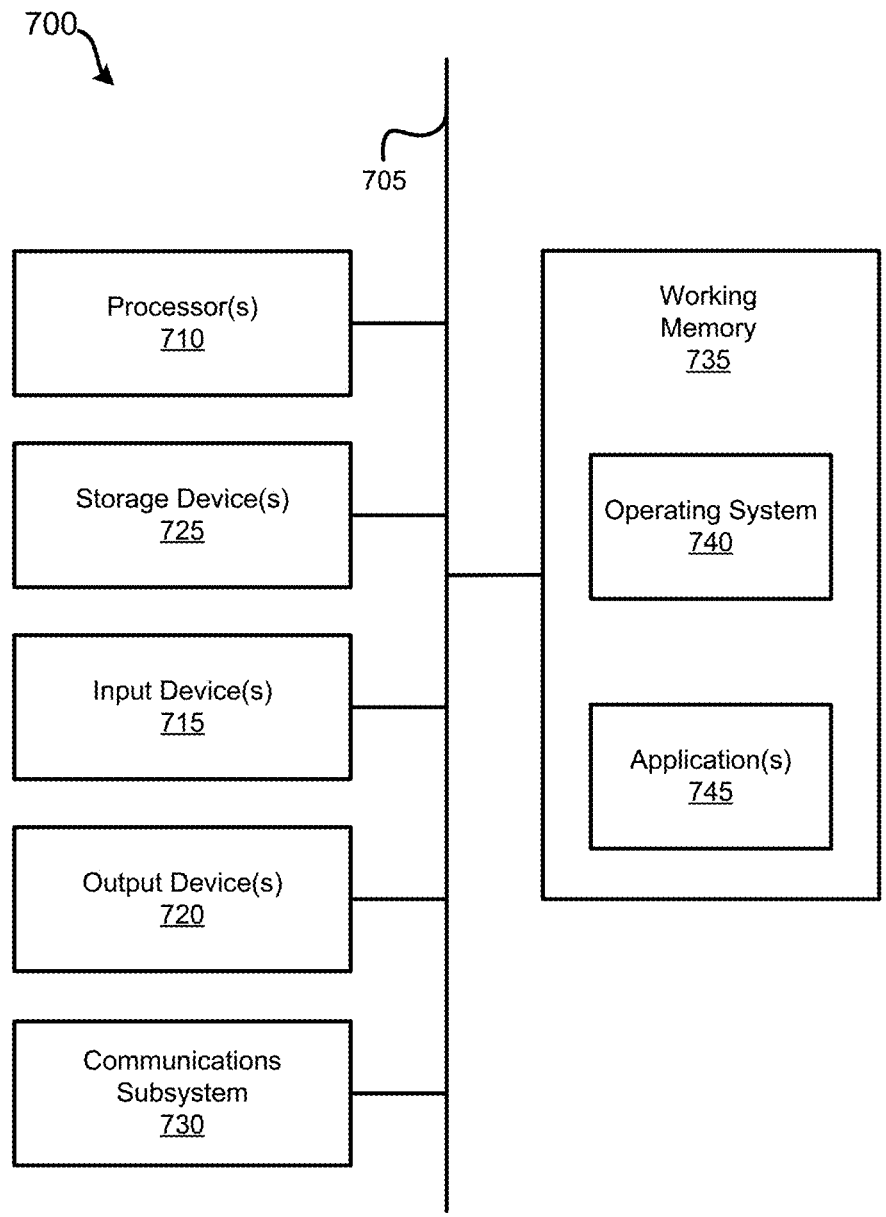
FIG. 7 illustrates an embodiment of a computer system that may be incorporated as part of the described computerized devices, in accordance with various embodiments of the present disclosure.

A computer system as illustrated in FIG. 7 may be incorporated as part of the previously described computerized devices, such as a content processing subsystem, a television receiver, and/or a television service provider system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, various embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed is:

1. A system comprising:
one or more processing devices; and
memory communicatively coupled with and readable by the one or more processing devices and having stored therein processor-readable instructions which, when executed by the one or more processing devices, cause the one or more processing devices to perform operations comprising:
receiving at least part of first audio video content;
detecting a first set of one or more audio characteristics and/or one or more visual characteristics of at least a portion of the first audio video content that is before an end of the first audio video content and/or of a segment of the first audio video content;
selecting second audio video content from a plurality of audio video content items based at least in part on matching a second set of one or more audio characteristics and/or one or more visual characteristics to the first set of one or more audio characteristics and/or one or more visual characteristics of at least the portion of the first audio video content; and
causing a content receiver to record and/or output the second audio video content after the end of the first audio video content and/or of the segment of the first audio video content.

2. The system as recited in claim 1, where the first set and the second set correspond to one or more music characteristics and/or one or more dialogue characteristics.

3. The system as recited in claim 1, where the first set and the second set correspond to one or more color characteristics.

4. The system as recited in claim 1, the operations further comprising only processing a last portion of the first audio video content before the end of the first audio video content and/or of the segment of the first audio video content to detect the first set of one or more audio characteristics and/or one or more visual characteristics of the last portion of the first audio video content.

5. The system as recited in claim 1, the operations further comprising:
processing at least a portion of the second audio video content to detect the second set of one or more audio characteristics and/or one or more visual characteristics of at least the portion of the second audio video content.

6. The system as recited in claim 5, where the processing at least the portion of the second audio video content corresponds to only processing an initial portion of the second audio video content to detect the second set of one or more audio characteristics and/or one or more visual characteristics of the initial portion of the second audio video content.

7. The system as recited in claim 1, the operations further comprising:
learning a pattern of color characteristics, dialogue characteristics, and/or music characteristics mapped to content viewed by a user;
where the selecting the second audio video content from the plurality of audio video content items is further based at least in part on matching the second set of one or more audio characteristics and/or one or more visual characteristics to the learned pattern of color characteristics, dialogue characteristics, and/or music characteristics.

8. The system as recited in claim 1, where the second audio video content is output sequentially after the end of the first audio video content and/or of the segment of the first audio video content.

9. A method comprising:
receiving at least part of first audio video content;
detecting a first set of one or more audio characteristics and/or one or more visual characteristics of at least a portion of the first audio video content that is before an end of the first audio video content and/or of a segment of the first audio video content;
selecting second audio video content from a plurality of audio video content items based at least in part on matching a second set of one or more audio characteristics and/or one or more visual characteristics to the first set of one or more audio characteristics and/or one or more visual characteristics of at least the portion of the first audio video content; and
causing a content receiver to record and/or output the second audio video content after the end of the first audio video content and/or of the segment of the first audio video content.

10. The method as recited in claim 9, where the first set and the second set correspond to one or more music characteristics and/or one or more dialogue characteristics.

11. The method as recited in claim 9, where the first set and the second set correspond to one or more color characteristics.

12. The method as recited in claim 9, further comprising only processing a last portion of the first audio video content before the end of the first audio video content and/or of the segment of the first audio video content to detect the first set of one or more audio characteristics and/or one or more visual characteristics of the last portion of the first audio video content.

13. The method as recited in claim 9, further comprising:
processing at least a portion of the second audio video content to detect the second set of one or more audio characteristics and/or one or more visual characteristics of at least the portion of the second audio video content.

14. The method as recited in claim 13, where the processing at least the portion of the second audio video content corresponds to only processing an initial portion of the second audio video content to detect the second set of one or more audio characteristics and/or one or more visual characteristics of the initial portion of the second audio video content.

15. The method as recited in claim 9, further comprising:
learning a pattern of color characteristics, dialogue characteristics, and/or music characteristics mapped to content viewed by a user;
where the selecting the second audio video content from the plurality of audio video content items is further based at least in part on matching the second set of one or more audio characteristics and/or one or more visual characteristics to the learned pattern of color characteristics, dialogue characteristics, and/or music characteristics.

16. The method as recited in claim 9, where the second audio video content is output sequentially after the end of the first audio video content and/or of the segment of the first audio video content.

17. One or more non-transitory, machine-readable media having machine-readable instructions thereon which, when executed by one or more processing devices, cause the one or more processing devices to perform operations comprising:

receiving at least part of first audio video content;

detecting a first set of one or more audio characteristics and/or one or more visual characteristics of least a portion of the first audio video content that is before an end of the first audio video content and/or of a segment of the first audio video content;

selecting second audio video content from a plurality of audio video content items based at least in part on matching a second set of one or more audio characteristics and/or one or more visual characteristics to the first set of one or more audio characteristics and/or one or more visual characteristics of at least the portion of the first audio video content; and causing a content receiver to record and/or output the second audio video content after the end of the first audio video content and/or of the segment of the first audio video content.

18. The one or more non-transitory, machine-readable media as recited in claim 17, where the first set and the second set correspond to one or more music characteristics and/or one or more dialogue characteristics.

19. The one or more non-transitory, machine-readable media as recited in claim 18, where the first set and the second set correspond to one or more color characteristics.

20. The one or more non-transitory, machine-readable media as recited in claim 17, the operations further comprising only processing a last portion of the first audio video content before the end of the first audio video content and/or of the segment of the first audio video content to detect the first set of one or more audio characteristics and/or one or more visual characteristics of the last portion of the first audio video content.

* * * * *

UNITED STATES PATENT AND TRADEMARK OFFICE
CERTIFICATE OF CORRECTION

| | | |
|---|---|---|
| PATENT NO. | : 12,250,431 B2 | Page 1 of 1 |
| APPLICATION NO. | : 18/154539 | |
| DATED | : March 11, 2025 | |
| INVENTOR(S) | : Abhijit Sharma | |

It is certified that error appears in the above-identified patent and that said Letters Patent is hereby corrected as shown below:

In the Claims

In Claim 17, Column 41, Line 8, please delete "of least" and insert -- of at least --

In Claim 19, Column 42, Line 10, please delete "claim 18" and insert -- claim 17 --

Signed and Sealed this
Twenty-second Day of April, 2025

Coke Morgan Stewart
*Acting Director of the United States Patent and Trademark Office*